US011848990B2

(12) United States Patent
Bogatin et al.

(10) Patent No.: US 11,848,990 B2
(45) Date of Patent: Dec. 19, 2023

(54) METHOD AND SYSTEM FOR DISTRIBUTING AND STORING CONTENT USING LOCAL CLOUDS AND NETWORK CLOUDS

(71) Applicant: Siden, Inc., New York, NY (US)

(72) Inventors: Boris Bogatin, Glenside, PA (US); Narayan Parappil Menon, Syosset, NY (US); Rajendra Singh, Indian Creek Village, FL (US); Gary M. Parsons, Potomac, MD (US)

(73) Assignee: Siden, Inc., New York, NY (US)

( * ) Notice: Subject to any disclaimer, the term of this patent is extended or adjusted under 35 U.S.C. 154(b) by 0 days.

(21) Appl. No.: 17/965,010

(22) Filed: Oct. 13, 2022

(65) Prior Publication Data

US 2023/0121384 A1  Apr. 20, 2023

Related U.S. Application Data

(60) Provisional application No. 63/256,067, filed on Oct. 15, 2021.

(51) Int. Cl.
*H04L 67/1097* (2022.01)
*H04L 47/12* (2022.01)

(52) U.S. Cl.
CPC .......... *H04L 67/1097* (2013.01); *H04L 47/12* (2013.01)

(58) Field of Classification Search
CPC . H04L 67/1097; H04L 47/12; H04N 21/4622; H04N 21/00; H04N 21/20
See application file for complete search history.

(56) References Cited

U.S. PATENT DOCUMENTS

| | | | |
|---|---|---|---|
| 5,652,759 A | 7/1997 | Stringfellow, Jr. | |
| 7,028,096 B1 * | 4/2006 | Lee | H04N 21/23106 |
| | | | 725/145 |
| 9,338,233 B2 * | 5/2016 | Raleigh | H04L 67/5681 |
| 9,456,247 B1 | 9/2016 | Pontual et al. | |
| 9,460,099 B2 * | 10/2016 | Thomas | G06F 16/16 |
| 9,503,510 B2 * | 11/2016 | Raleigh | H04L 67/55 |
| 9,740,468 B2 * | 8/2017 | Arrouye | H04L 67/06 |
| 9,792,298 B1 * | 10/2017 | Taylor | G06F 16/1844 |
| 10,021,185 B1 * | 7/2018 | Kleinschnitz, Jr. | G06F 9/5011 |

(Continued)

FOREIGN PATENT DOCUMENTS

| | | |
|---|---|---|
| CN | 1984118 A | 6/2007 |
| CN | 105391516 A | 3/2016 |

(Continued)

OTHER PUBLICATIONS

Pixeom website; https://pixeom.com/; 10 pages.

(Continued)

*Primary Examiner* — Shean Tokuta
(74) *Attorney, Agent, or Firm* — Harness, Dickey & Pierce, P.L.C.

(57) ABSTRACT

A system and method of operating a content distribution system includes determining a placement metric for a first object, communicating the first object to a local cloud associated with a user device or a network cloud based on the placement metric by control of a content distribution system, storing the first object in the local cloud or the network cloud and consuming the first object using the local cloud or the network cloud.

43 Claims, 12 Drawing Sheets

(56) References Cited

U.S. PATENT DOCUMENTS

| | | | |
|---|---|---|---|
| 10,091,290 B1* | 10/2018 | Hansen | H04L 67/1097 |
| 10,291,735 B2* | 5/2019 | Coglitore | H04L 67/563 |
| 10,382,812 B1* | 8/2019 | McCarty | H04N 21/4756 |
| 10,433,022 B2 | 10/2019 | Norin et al. | |
| 10,686,905 B1* | 6/2020 | Word | H04L 67/1097 |
| 11,388,252 B2* | 7/2022 | Luft | H04L 67/5682 |
| 11,418,616 B1* | 8/2022 | Kumar | H04L 67/55 |
| 2004/0064325 A1 | 4/2004 | Syed et al. | |
| 2005/0283649 A1* | 12/2005 | Turner | H04L 51/42 714/6.12 |
| 2007/0002871 A1 | 1/2007 | Pekonen et al. | |
| 2007/0094023 A1 | 4/2007 | Gallino et al. | |
| 2008/0244657 A1 | 10/2008 | Arsenault et al. | |
| 2008/0273591 A1 | 11/2008 | Brooks et al. | |
| 2009/0040957 A1 | 2/2009 | Anschutz | |
| 2010/0023972 A1 | 1/2010 | Summers et al. | |
| 2011/0044227 A1 | 2/2011 | Harrang et al. | |
| 2011/0059706 A1 | 3/2011 | Harel et al. | |
| 2013/0066936 A1* | 3/2013 | Krishnan | H04L 67/5681 709/201 |
| 2013/0254815 A1 | 9/2013 | Pfeffer et al. | |
| 2013/0339407 A1* | 12/2013 | Sharpe | G06F 16/182 707/827 |
| 2014/0025837 A1* | 1/2014 | Swenson | H04N 21/2396 709/231 |
| 2014/0270713 A1* | 9/2014 | Hybertson | H04N 21/4334 386/295 |
| 2014/0334318 A1 | 11/2014 | Pica et al. | |
| 2015/0012615 A1* | 1/2015 | Li | H04L 65/70 709/219 |
| 2015/0039601 A1* | 2/2015 | Harrang | G06F 16/951 707/769 |
| 2015/0294002 A1* | 10/2015 | Corbett | G06F 16/24539 707/765 |
| 2015/0319247 A1* | 11/2015 | Moromisato | H04L 67/568 709/214 |
| 2016/0028448 A1 | 1/2016 | Park et al. | |
| 2016/0132522 A1* | 5/2016 | Lee | H04L 67/06 707/827 |
| 2016/0188700 A1* | 6/2016 | Kleinschnitz, Jr. | G06F 16/285 707/738 |
| 2016/0259802 A1* | 9/2016 | Sedayao | G06F 3/067 |
| 2016/0360255 A1 | 12/2016 | Pontual et al. | |
| 2017/0013046 A1* | 1/2017 | Flynn | H04L 67/01 |
| 2017/0171114 A1* | 6/2017 | Dao | H04L 67/568 |
| 2017/0230450 A1* | 8/2017 | Burba | H04L 67/60 |
| 2017/0302575 A1* | 10/2017 | Ward | H04L 69/18 |
| 2018/0138958 A1 | 5/2018 | Asplund et al. | |
| 2018/0139508 A1 | 5/2018 | Norin et al. | |
| 2018/0248948 A1* | 8/2018 | Rementilla | H04L 43/0882 |
| 2018/0337993 A1* | 11/2018 | Kumar Kasturi | H04L 67/1097 |
| 2019/0056998 A1* | 2/2019 | Grube | H04L 67/1097 |
| 2019/0223029 A1 | 7/2019 | Clarke et al. | |
| 2019/0273801 A1 | 9/2019 | Luft | |
| 2020/0021655 A1* | 1/2020 | Hasek, IV | H04L 67/306 |
| 2020/0034050 A1* | 1/2020 | Brasfield | G06F 12/084 |
| 2020/0037035 A1 | 1/2020 | Kaufman et al. | |
| 2020/0195745 A1 | 6/2020 | Demsey | |
| 2020/0243985 A1 | 7/2020 | Petersson et al. | |
| 2020/0296155 A1 | 9/2020 | McGrath et al. | |
| 2020/0328804 A1 | 10/2020 | Xu et al. | |
| 2020/0358646 A1 | 11/2020 | Lincoln et al. | |
| 2020/0374713 A1 | 11/2020 | Bogatin et al. | |
| 2021/0067814 A1 | 3/2021 | Bogatin et al. | |
| 2021/0098873 A1 | 4/2021 | Veysoglu et al. | |
| 2021/0099749 A1 | 4/2021 | Bogatin et al. | |
| 2021/0127167 A1 | 4/2021 | Kaufman et al. | |
| 2021/0152865 A1* | 5/2021 | Kumar | H04N 21/234381 |
| 2021/0165840 A1* | 6/2021 | Kotla | G06F 16/2228 |
| 2022/0109724 A1* | 4/2022 | Menon | H04L 67/5681 |
| 2023/0021435 A1* | 1/2023 | Menon | H04W 72/23 |
| 2023/0121384 A1* | 4/2023 | Bogatin | H04L 47/12 709/219 |

FOREIGN PATENT DOCUMENTS

| | | | | |
|---|---|---|---|---|
| EP | 1030465 A1 | 8/2000 | | |
| EP | 3456083 B1 | 3/2020 | | |
| EP | 3771993 A1 * | 2/2021 | | G06F 16/27 |
| GB | 2412760 A * | 10/2005 | | G06F 16/10 |
| JP | 2001-313599 A | 11/2001 | | |
| JP | 2002-152153 A | 5/2002 | | |
| JP | 2003-169363 A | 6/2003 | | |
| JP | 2010-027004 A | 2/2010 | | |
| JP | 2015-532033 A | 11/2015 | | |
| KR | 2011-0093993 A | 8/2011 | | |
| KR | 102225577 B1 * | 3/2021 | | |
| WO | WO-03058967 A1 | 7/2003 | | |
| WO | WO-2011/139305 A1 | 11/2011 | | |
| WO | WO-2013103828 A1 | 7/2013 | | |
| WO | WO-2014093705 A1 * | 6/2014 | | G06F 15/16 |
| WO | WO-2018/001897 A1 | 1/2018 | | |
| WO | WO-2023009382 A1 * | 2/2023 | | H04W 24/02 |

OTHER PUBLICATIONS

Datami website; http://www.datami.com/; 9 pages.
Partial International Search Report for corresponding PCT/US2017/061760, dated Mar. 20, 2018, 13 pages.
Requirement for Restriction Election regarding U.S. Appl. No. 15/811,958 dated Jun. 7, 2018.
Non-Final Office Action regarding U.S. Appl. No. 15/811,958 dated Oct. 10, 2018.
Notice of Allowance regarding U.S. Appl. No. 15/811,958 dated May 22, 2019.
Chinese Office Action dated Apr. 3, 2020 in corresponding Chinese Application No. 2017800705362.
Japanese Office Action dated Dec. 1, 2020 in corresponding Japanese Application No. 2019-547232.
International Search Report and Written Opinion dated Dec. 9, 2020 in corresponding PCT Application No. PCT/US2020/053313.
Interntional Search Report dated Oct. 21, 2021 in corresponding PCT Application No. PCT/US2021/041116.
International Search Report and Written Opinion dated Jul. 17, 2020 in corresponding PCT/US2020/034247.
International Search Report dated Feb. 3, 2022 in corresponding PCT Application No. PCT/2021/055714.
International Search Report and Written Opinion dated Mar. 21, 2022 in corresponding PCT Application No. PCT/US2021/053154.
Yao Jingjing et al., "On Mobile Edge Caching", IEEE Communications Surveys & Tutorials, vol. 21, No. 3, Mar. 29, 2019, pp. 2525-2553.
International Search Report and Written Opinion dated Apr. 21, 2022 in corresponding PCT Application No. PCT/US2022/013293.
International Search Report and Written Opinion dated Jun. 21, 2022, in corresponding International Application No. PCT/US2022/021306.
International Search Report and Written Opinion dated Aug. 1, 2022 in corresponding PCT Application No. PCT/US2022/028725.
Symeon Chatzinotas et al., "Cellular-Broadcast Service Convergence through Caching for CoMP Cloud RANs", Arxiv. Org, Cornell University Library, 201 Olin Library Cornell University Ithaca, NY 14853, Apr. 30, 2015.
International Search Report and Written Opinion dated Aug. 19, 2022 in corresponding PCT Application No. PCT/US2022/031517.
International Search Report dated Nov. 4, 2022 in corresponding PCT Application No. PCT/US2022/037896.
International Search Report and Written Opinion dated Mar. 14, 2023 in corresponding PCT Application No. PCT/US2022/046640.

* cited by examiner

METHOD AND SYSTEM FOR DISTRIBUTING AND STORING CONTENT USING LOCAL CLOUDS AND NETWORK CLOUDS

CROSS-REFERENCE TO RELATED APPLICATIONS

This is a non-provisional application of provisional application 63/256,067 filed on Oct. 15, 2021, the disclosure of which is incorporated by reference herein. This application incorporates by reference herein the entire disclosures of applications, 63/51,582, filed on Jul. 14, 2020, U.S. Ser. No. 63/50,699, filed on Jul. 10, 2020, U.S. Ser. No. 17/542,582 filed on Dec. 6, 2021, U.S. Ser. No. 17/580,817, filed on Jan. 21, 2022, U.S. Ser. No. 17/700,436, filed on Mar. 21, 2022, U.S. Ser. No. 17/741,301, filed on May 10, 2022, U.S. Ser. No. 17/095,686, filed on Nov. 11, 2020, U.S. Ser. No. 16/588,763, filed Sep. 30, 2019, U.S. Ser. No. 17/489,912, filed on Sep. 30, 2021, U.S. Pat. No. 10,433,222, issued on Oct. 1, 2019 and U.S. Ser. No. 17/353,989, filed Jun. 22, 2021.

TECHNICAL FIELD

The present disclosure relates generally to content distribution systems and, more specifically, to a method and system for distributing and storing content using local clouds and network clouds.

BACKGROUND

The statements in this section merely provide background information related to the present disclosure and may not constitute prior art.

The provisioning of increasingly higher speed wireless data connectivity has been the focus of wireless carrier infrastructure growth for several decades and has accelerated with the rapidly rising demand by consumers to stream video to each or any of their devices, irrespective of where they are. The increasing wireless performance, together with the desire of users to consume more bandwidth intensive video content over the Internet, at lower marginal cost per bit, and wireless providers desire to serve more of the users' demands including in the home and also to large screen devices (i.e., TVs, laptops), is placing a requirement on wireless networks to accommodate a markedly higher level of capacity for handling this exploding video data traffic demand over wireless networks.

Further, wireless networks are still approaching video distribution using traditional means, which can be improved upon. Today, video data traffic is carried over wireless networks at the same time, as when consumers desire to consume such video data traffic. Since consumers consume data traffic at times driven largely by social structures, with significant consumption happening at the same time across the consumer base including during "prime time" hours, time intervals of significant "peak" consumption are typical and wireless networks often have insufficient capacity to handle such peak loads. Further, consumers mostly consume different content than other consumers at any given point of time, precluding efficient use of broadcasting content to users for real-time consumption (since it has low relevancy) outside of select live content (i.e., sports events, time-scheduled releases of popular shows). However, consumers consume largely the same long-form content (i.e., blockbuster movies and hit TV series) as other consumers, over a longer period of time, so it is possible to "predict" what a consumer would consume with higher accuracy if the real-time requirement is relaxed to "over 3 months" or some other such longer than real-time timeframe. A system that would identify the content generally desired by consumers, that would broadcast such content over the networks in advance of the time it is desired to be consumed by consumers and during such times when the wireless networks had "spare capacity" not needed for real-time traffic needs, that would store such content locally at the consumers' premises, and serve such content to consumers over an unconstrained medium (i.e., home Wi-Fi network), would be able to relieve wireless networks from significant amount of video data content and corresponding congestion.

Today's abundant availability of computing and storage capacity, even for personal use, provides a platform for strategically targeted delivery of executables, content and services from one or more of many locations within a system. Such an architecture enables services to be delivered from the most optimal locations in a system, and computing (processing) to occur at the most optimal locations, i.e., from within a private network, such as a home or enterprise network (a "local cloud 20") or a "network cloud 16", which is the cloud deeper in the network.

Moreover, the growth of storage and computing capacity, both in terms of performance and cost-effectiveness, has generally outpaced that of networking capacity.

SUMMARY

The present disclosure provides a system and method for strategically using storage devices strategically to reduce system resources in providing content to users.

The skew in favor of computing and storage are exploited by the present disclosure to locate services and computing power close to the end user, reducing the use of the wide-area network to when it is absolutely necessary.

The framework can be further is optimized to ensure that the right subsets of content and services are positioned in, and delivered from, different locations in the network. A variety of smart metrics can be leveraged to determine what to place in a local cloud versus in the network cloud. Content and user data can be seamlessly transferred back and forth between these domains, based on usage patterns and a slew of additional parameters.

Additionally, application code can be smartly distributed across different locations in the system, allowing applications to execute in hybrid mode across multiple locations, e.g., have portions of an application execute on the compute of the local cloud and other components of the application execute deeper within the network.

Furthermore, the wide-area network can be utilized in a smart, optimized manner based on the general usage level of the network and spare capacity available. The use of dormant (unused or excess) capacity to move content back and forth is a part of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect is a method that includes determining a placement metric for a first object. The method also includes communicating the first object to a local cloud associated with a user device or a network cloud based on the placement metric by control of a content distribution system. The method also includes storing the first object in the local cloud or the network cloud. The method also includes consuming the first object using the local cloud or the network cloud. Other embodiments of this aspect include corresponding computer systems, apparatus, and computer programs recorded on one or more computer storage devices, each configured to perform the actions of the methods.

Implementations may include one or more of the following features. The method where communicating the first object may include communicating a first part of the first object to the local cloud and a second part of the first object to the network cloud based on the placement metric. The method where consuming the first object may include consuming the first part from the local cloud and consuming the second part from the network cloud synchronously. The method where communicating the first object may include communicating the first object by a personal cloud content distribution system associated with the user device. Storing the first object at the local cloud or the network cloud may include communicating the first object to the local cloud using dormant network capacity in a downlink direction. The method may include communicating the first object to the local cloud through a first communication network or a plurality of communication networks. The method may include selecting at least one communication network from a plurality of networks based on bandwidth availability in the plurality of networks: and communicating the first object to the local cloud through the at least one communication network. The method may include communicating the first object to the network cloud through a first communication network or a plurality of communication networks. The method may include selecting at least one communication network from a plurality of networks based on bandwidth availability in the plurality of networks: and communicating the first object to the network cloud through the at least one communication network. The method may include communicating the first object to the local cloud associated with the user device or the network cloud may include communicating the first object from the local cloud to the network cloud based on a change to the placement metric, the method where communicating the first object to the local cloud associated with the user device or the network cloud may include communicating the first object from the network cloud to the local cloud based on a change to the placement metric. The method may include communicating the first object to the local cloud associated with the user device or the network cloud based on the placement metric may include communicating the first object to the local cloud associated with the user device or the network cloud based on a policy to secure the first object in the local cloud. The method may include controlling the policy to secure the first object from the user device. The method may include controlling the policy to secure the first object from the content distribution system. Communicating the first object to the local cloud associated with the user device or the network cloud based on the placement metric may include communicating the first object to the local cloud associated with the user device or the network cloud by broadcasting or unicasting. The method may include communicating the first object to the local cloud associated with the user device or the network cloud based on the placement metric may include communicating the first object to the local cloud associated with the user device or the network cloud based on the placement metric may include a likelihood of the user device using the first object and a timeliness of the likelihood of the user using the first object. The method may include communicating the first object to the local cloud associated with the user device or the network cloud based on the placement metric may include communicating the first object to the local cloud associated with the user device or the network cloud based on the placement metric may include an expected frequency of use by the user device. Communicating the first object to the local cloud associated with the user device or the network cloud based on the placement metric may include communicating the first object to the local cloud associated with the user device or the network cloud based on the placement metric may include a comparison of a network bandwidth requirement for fetching the first object and, storage and compute costs for accessing the first object. The method may include communicating the first object to the local cloud associated with the user device or the network cloud based on the placement metric may include communicating the first object to the local cloud associated with the user device or the network cloud based on the placement metric may include a higher performance experienced by fetching the first object by the user device from the local cloud versus fetching the first object from the network cloud. Determining a placement metric for a first object may include determining a placement metric for the first object may include at least one of user data, media content, gaming data, an executable software object, a gaming application, a file accessed by the user device, a policy and a configuration information from the network. Storing the first object in the local cloud or the network cloud may include storing the first object in the local cloud and periodically synchronizing the first object in the local cloud from the network cloud. Storing the first object in the local cloud or the network cloud may include storing the first object may include a backup of personal data from the user device in the local cloud. Storing the first object in the local cloud or the network cloud may include storing the first object in the network cloud using dormant network capacity in an uplink direction. Placement of the first object at the network cloud may include communicating the first object to the network cloud based on a placement metric, such placement metric based on a low likelihood of the user device using the first object or a lack of timeliness of the likelihood of the user device using the first object. The method may include communicating the first object to the local cloud associated with the user device or the network cloud based on the placement metric may include communicating the first object to the network cloud based on the placement metric may include an expected frequency of use by the user device below a usage threshold Communicating the first object to the local cloud associated with the user device or the network cloud based on the placement metric may include communicating the first object to the network cloud based on the placement metric may include higher performance resulting from storage and compute costs for accessing the first object outweighing network bandwidth requirements for fetching the first object. Communicating the first object to the local cloud associated with the user device or the network cloud based on the placement metric may include communicating a first part of the first object to the local cloud based on a higher performance of fetching from the cloud as compared to the network cloud and, communicating a second part of the first object to the network cloud based on a compute requirement of the second part. Communicating the first object to the local cloud associated with the user device or the network cloud based on the placement metric may include communicating a first part of the first object to the local cloud based a first fulfillment requirement of the first part compared to local cloud resources and communicating a second part of the first object to the network cloud based on a second fulfilment requirement of the second part compared to network cloud resources. The method may include communicating the first object to the local cloud associated with the user device or the network cloud based on the placement metric may include communicating a first part of the first object to the local cloud based the local cloud efficiency and communicating a second part of the first object to the network cloud based on the network cloud efficiency. The local cloud efficiency is based on system bandwidth outweighing a local compute and the network cloud efficiency is based on the network compute outweighing the system bandwidth. Communicating the first object to the local cloud associated with the user device or the network cloud based on the placement metric may include communicating a first part of the first object to the local cloud and communicating a second part of the first object to the network cloud based on comparing. Communicating the first object to the local cloud associated with the user device or the network cloud based on the placement metric may include communicating the first object to the network cloud based on the placement metric may include a policy to secure the first object in the network cloud. The method may include controlling the policy to secure the first object in the network cloud by the user device. The method may include controlling the policy to secure the first object in the network cloud by the distribution system. The method may include storing the first object in the local cloud or the network cloud may include storing the first object in the network cloud and periodically synchronizing the first object in the network cloud from the local cloud. The method may include storing the first object in the local cloud or the network cloud may include storing the first object may include an update from the user device to a file stored in the network cloud. The method may include storing the first object in the local cloud or the network cloud may include storing the first object may include analytics data, auditing data, or historical data resulting from an operation of services by the user device at the local cloud. The method may include storing the first object in the local cloud or the network cloud may include storing the first object may include data generated by an application run by the user device in the local cloud. The method may include storing the first object in the local cloud or the network cloud may include storing the first object may include content created by the user device within the local cloud in the network cloud. The method may include storing the first object in the local cloud or the network cloud may include storing the first object may include data that is generated within the local cloud from online activities of the user device with an expected frequency of use below a usage threshold within the network cloud. Communicating the first object to the local cloud associated with the user device or the network cloud may include communicating the first object to the local cloud may include one of a home network, enterprise network, venue network. The method may include communicating the first object to the local cloud associated with the user device or the network cloud based on the placement metric may include communicating the first object to the local cloud based on the placement metric may include a placement policy determined at the content distribution system. Communicating the first object to the local cloud associated with the user device or the network cloud based on the placement metric may include communicating the first object to the network cloud based on the placement metric may include a placement policy determined at the user device. Implementations of the described techniques may include hardware, a method or process, or computer software on a computer-accessible medium.

One general aspect a method includes generating, by a user device, a request for a first object. The method also includes communicating the request for the first object to a distribution system. The method also includes communicating a network resource query signal from the distribution system to a network cloud and local resource query signal from the distribution system to a local cloud. The method also includes communicating a first resource acknowledgement signal from the network cloud and a second resource acknowledgement signal from the local cloud. The method also includes selecting a resource from a plurality of resource locations based on availability of the first object at the plurality of resource locations, and comparing networking, storage and compute costs and a performance for using a resource of the local cloud and the network cloud. The method also includes generating a redirect signal may include an identifier for the resource. The method also includes communicating the redirect signal from the distribution system to the user device. The method also includes communicating a request, by the user device, to the resource for the first object based on the identifier. Other embodiments of this aspect include corresponding computer systems, apparatus, and computer programs recorded on one or more computer storage devices, each configured to perform the actions of the methods.

Implementations may include one or more of the following features. The method where communicating the redirect signal may include communicating the redirect signal for a first part of the first object corresponding to the local cloud and a second part of the first object from the network cloud, and where communicating the request may include communicating a first request for the first part to the local cloud and a second request for the second part to the network cloud. The method may include consuming the first part from the local cloud and consuming the second part from the network cloud synchronously. The method may include executing the first part from the local cloud and executing the second part from the network cloud synchronously. The method may include executing the first object at the resource based on the request. The method may include communicating the request may include communicating the request to the local cloud. The method may include communicating the request may include communicating the request to the network cloud. The method may include generating the request for the first object may include generating the request for the first object may include at least one of user data, media content, gaming data, an executable software object, a gaming application, a file accessed by the user device, a policy and configuration information from the network. The method may include communicating the request for the first object to the distribution system may include communicating the request for the first object to the distribution system through a wireless network. The method may include communicating content from the resource location to the user device. Implementations of the described techniques may include hardware, a method or process, or computer software on a computer-accessible medium.

One general aspect is a system that includes a network cloud; a local cloud; a content distribution system programmed to determine a placement metric for a first object, communicate the first object to a local cloud associated with a user device or a network cloud based on the placement metric by control of a content distribution system, and store the first object in the local cloud or the network cloud. The system also includes a user device consuming the first object using the local cloud or the network cloud. Other embodiments of this aspect include corresponding computer systems, apparatus, and computer programs recorded on one or more computer storage devices, each configured to perform the actions of the methods.

One general aspect is a system that includes a distribution system. The system also includes a local cloud. The system also includes a network cloud. The system also includes a user device generating a request for a first object and communicating the request for the first object to the distribution system. The system also includes said distribution system communicating a network resource query signal to the network cloud and local resource query signal from the distribution system to the local cloud. The system also includes the network cloud communicating a first resource acknowledgement signal to the distribution system. The system also includes the local cloud communicating a second resource acknowledgement signal from the local cloud. The system also includes the distribution system selecting a resource from a plurality of resource locations based on availability of the first object at the plurality of resource locations, and comparing networking, storage and compute costs and a performance for using a resource of the local cloud and the network cloud. The system also includes a request router generating a redirect signal may include an identifier for the resource and communicating the redirect signal from the distribution system to the user device. The system also includes the user device communicating a request to the resource for the first object based on the identifier. Other embodiments of this aspect include corresponding computer systems, apparatus, and computer programs recorded on one or more computer storage devices, each configured to perform the actions of the methods.

Further areas of applicability will become apparent from the description provided herein. The description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
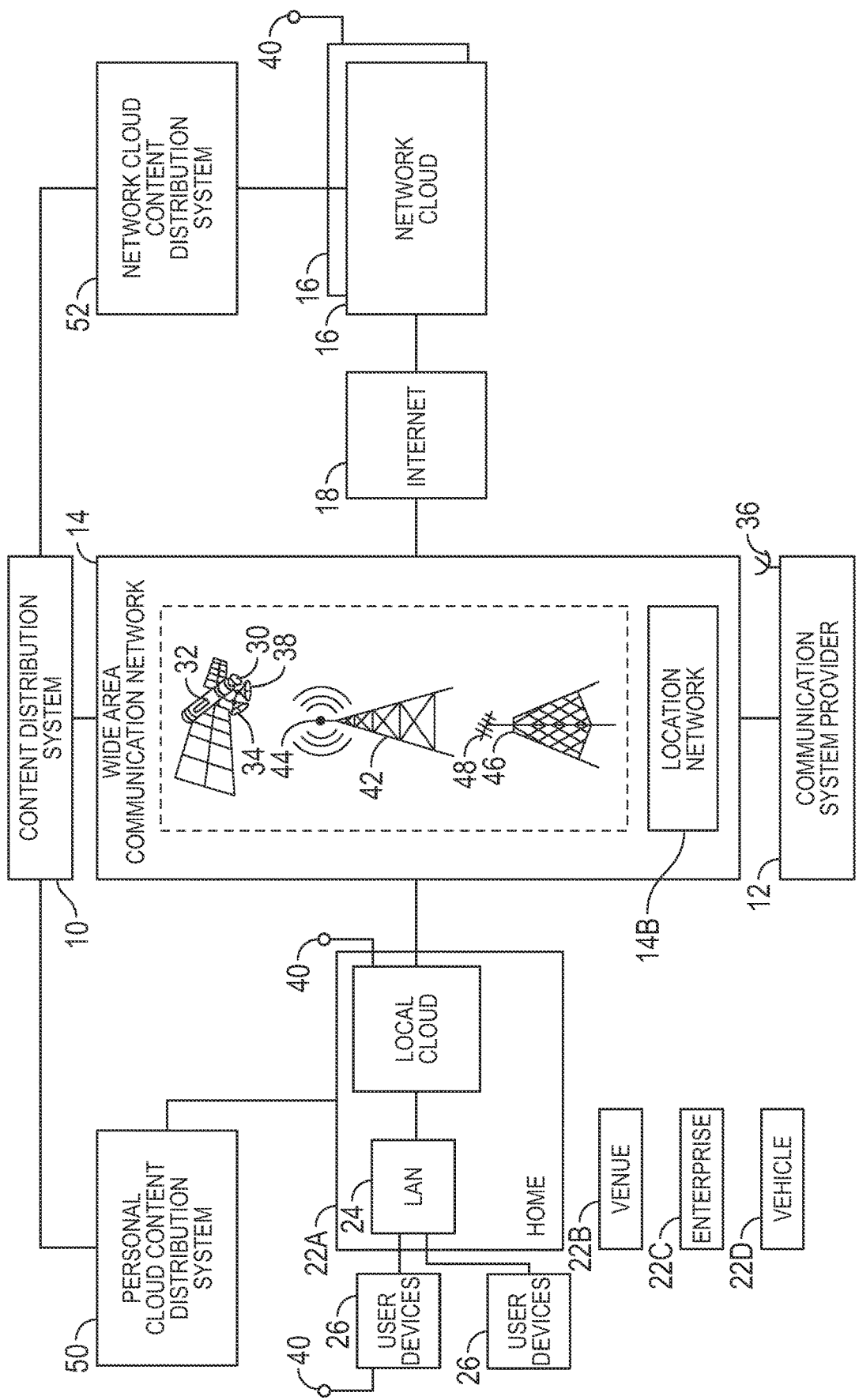
FIG. 1 is a high-level block diagrammatic view of the content distribution system 10.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure. The teachings of the present disclosure may be implemented in a system for electronically communicating content to an end user or user device. Both the data source and the user device may be formed using a general computing device having a memory or other data storage for incoming and outgoing data. The data and content storage may be memory and may comprise but is not limited to a hard drive, FLASH, RAM, PROM, EEPROM, ROM phase-change memory or other discrete memory components.

Each general-purpose computing device may be implemented electronically in analog circuitry, digital circuitry or combinations thereof. Further, the computing device may include a microprocessor or microcontroller that is programmed to perform instructions (instruction signals) to carry out the steps performed by the various system components. A content or service provider is also described. A content or service provider is a provider of data to the end user. The content service provider, for example, may provide data corresponding to the content such as metadata as well as the actual content in a data stream or signal. The content distribution system, service provider and end user devices may include a general-purpose computing device, communication components, network interfaces and other associated circuitry to allow communication with various other devices in the system.

Further, while the following disclosure is made with respect to the delivery of video content (e.g., television (TV), movies, music videos, etc.), it should be understood that the systems and methods disclosed herein could also be used for delivery of any media, data and content type, for example, audio, music, data files, web pages, advertising, software code, software updates, IoT data, weather, applications, application data, "best of web" content, e-delivery of materials, analytics data, auditing data, or historical data resulting from an operation of services, emails, texts, gaming results or gaming data, application data, etc. The data and content may collectively be referred to as an object or data object. By way of example analytics and historical data resulting from an IoT, home security services or other services in a home, venue or enterprise may be stored. Additionally, throughout this disclosure reference is made to data, content, information, programs, movie trailers, movies, advertising, assets, video data, etc., however, it will be readily apparent to persons of ordinary skill in the art that the terms are substantially equivalent in reference to the example systems and/or methods disclosed herein.

While the following disclosure is made with specific broadcast services and network systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point distribution system (MMDS), Local Multi-point distribution system (LMDS), etc.), Internet-based distribution systems, or mobile distribution systems, power-line broadcast systems, any point-to-point and/or multicast Internet Protocol (IP) delivery network, and fiber optic networks. Further, the different functions collectively allocated among a service provider and user devices as described below may be reallocated as desired without departing from the intended scope of the present disclosure.

User devices, local clouds and network clouds may be coupled to the Internet through a constrained network or not even coupled to the Internet at all. In a constrained network, the speed or available resources may not be sufficient to provide a quality level of service. In the following examples, dormant capacity of the constrained network or a second less constrained network may be used to pre-position content at the local or network cloud. The pre-positioned content may then be provided from the local cloud directly or through a second communication network (i.e., local network) when demanded at the user device for real-time consumption, without having to rely on using the constrained network for that real-time consumption. The local cloud may be located between the cellular network or other communication network and the user devices. In certain instances, the word "user" is used interchangeably with a device associated with a user (a user device) since each user has a user device associated therewith. As will be described below the clouds may store content therein and may communicate content therefrom. When receiving the content from the content distribution system, devices may be referred to as a source device because the device will become the source for communication of the content for other devices referred to as target devices.

Wide area network dormant capacity is a resource or a plurality of resources that are not being used for transmitting data or content by a content system provider during regular customer use. Capacity may refer to the amount of bandwidth or spectrum available (bandwidth availability). Regular use of a communication network for primary customers may be referred to as a primary use. Dormant capacity may be referred to as a secondary use and may be governed between agreements between a content provider and a communication system provider. The content provider may wish to provide a service to users using the dormant capacity. Users may not be aware of the path the content traverses. The use of resources for the dormant capacity has a lower priority that may be allocated to another for a higher priority use. In the simplest sense, dormant capacity is a data path or bandwidth that is increasingly left unutilized during non-peak times of network use. Inversely, there is limited dormant capacity available during the peak times of network use. In all cases, such peak time of network use is characterized as the time when most of the usage of the services offered by the network is taking place by the network's users or direct customers. The non-peak time is the time when the least usage of the services is taking place by their users. For example, in a long-term evolution wireless network (LTE) system, which a wide area network, dormant capacity may be the bandwidth not being used for voice or data content requested from users in real-time. In the cases of "spectrum re-use," capacity used by some users for real-time consumption of some content during peak times, may leave dormant capacity at the same time as capacity that is either unusable by other users for real-time consumption of other content or only usable by other users for real-time consumption of the same content, if that content is broadcasted instead of unicasted. In the case of "network re-use," capacity used by some users for real-time consumption of content may leave dormant capacity that is not demanded by other users. In a satellite system, the dormant capacity is the bandwidth not being used for broadcasting of content to users for the sake of real-time consumption of such content or for voice or data content requested from users in real-time and may similarly be under-utilized as in wireless network systems. There is a very limited incremental cost for utilizing this dormant capacity, or the unused or under-used resources of a communication provider's network, as that cost is already being borne for the provision of regular customer use services, and as such offers means for highly cost-effective content distribution. By utilizing the dormant capacity that would otherwise be wasted, the present system allows communication system providers to use it to offer other services to customers or to sell the capacity to others.

Local area network dormant capacity (dormant local capacity) is a resource that is not being used for transmitting data or content through the local area network during regular customer use. The local area network may include a plurality of end user devices, network clouds and local clouds that receive content through the capacity of the system. Capacity may refer to the amount of bandwidth or spectrum available for dormant use. Dormant local capacity may also refer to a band or separate radio resource not user by the local area network users or any capacity accessible to the device. Regular use of the local area network for primary customer devices may be referred to as a primary use, while unused capacity may be referred to as secondary use.

The dormant capacity may be used in various ways by intercommunication of the clouds. In the cases of "spectrum re-use", there have been many efforts to generate additional parallel uses of the same spectrum for real-time consumption by multiple users, using the same spectrum. However, utilizing dormant capacity, an almost infinitely high (as far as the number of users benefitting) amount of re-use may be generated by simply broadcasting this content, instead of unicasting it, and by having some users use it for real-time consumption, and for the dormant capacity to be used for non-real-time consumption by storing this same content at other cloud devices at this same time, and then accessed by other users during a different time in the future, directly or using other communication networks, which may also be less constrained than the network described herein. Further, in the cases of "network re-use", today this dormant capacity goes largely unutilized as operators have had a challenging time of incentivizing "changes in user behavior" to use the network more during "off-peak" times than they otherwise would like for real-time consumption. The benefit to consumers of using the network during peak times for real-time consumption instead of during off-peak times, far outweigh any incentives or benefits which the operators may pass on to the consumers to shift their real-time consumption. However, such dormant capacity may be used in-full for nonreal-time consumption, by unicasting or broadcasting content using dormant capacity and by storing this content at the local and network clouds, and then accessed by other users during a different time in the future, directly or using other communication networks, which may be less constrained than the network described herein.

Queries as to the current availability of capacity and the upcoming availability of capacity, including real-time consumptions and the remaining capacity, may be formed in order to identify the availability of dormant capacity. Further, Quality of service (QoS) prioritization using evolved multimedia broadcast and multicast services (eMBMS) quality class identifiers, as well as quality-of-service class identifiers (QCIs) used in any wireless or other communication system, may be performed, providing higher QCI levels to traffic for real-time consumption, while leaving traffic for non-real-time consumption on lower QCI levels, effectively rendering it to use of dormant capacity only.

Prioritization of content to be communicated using the dormant capacity may be formed. Delivery of content using dormant capacity may be queue-driven. All of the content to be delivered may be placed into the queue with attributed priority levels for each portion of content, and then served from the queue automatically upon dormant capacity availability, coordinating which content is served in which sequence per what rule. Content may also be retransmitted using dormant capacity. User preferences (queuing), missing content (error correction), content most popular for some users (personalization), likelihood of consumption, content most popular for most users (popularity or short-tail optimization), as well as the remainder of content may all be used in prioritizing within queues.

The present system provides a system architecture of a personal cloud for a user comprising a local cloud and a network cloud. The system architecture and platform utilize local and network cloud frameworks to enable seamless data access and computing from either the local cloud or network cloud. Excess capacity is used to pre-position data, executable software object or code and content in any part of the system. The excess capacity may be dormant capacity on a downlink and an uplink and may be independently determined.

The system uses intelligence to determine the resources within the network to use for various functions. The resources include networking, data storage and compute costs. The system may determine where to optimally position data, code and content. The system has the ability to distribute computing or processing in a local cloud which is used as a platform to position services locally. The system allows flexible movement of code, files, content and data between the local cloud and the network cloud. The flexible movement of code, files and content allows optimized performance for the user by increasing throughput and reducing latency, jitter, startup time. The user system offloads functions from the wide-area network where possible. The system provides smart distribution of data, content and executable software object or code between the network cloud and the local cloud based on the user's past usage patterns, predictions of future usage and other factors. Seamless access of computing power, content and data by the user is performed without true awareness of whether the resources are local or in the network cloud, or at other locations in the system.

Storage decisions may be made based on various factors. For example, content may be stored in the local cloud that the system determines the user is most likely to need in the near future. Truly private user data may be kept within designated storage areas within the system using geofencing. Tiered storage availability may also be enabled in the local cloud. That is, tiered charging for storage may be performed. By having storage capability and hardware available as a baseline but enable additional storage to be usable incrementally. A customer, for example, may be shipped additional storage hardware components as needed or as requested.

Tiered pricing for storage, computing resources in local cloud and access to networking use (real time versus excess capacity uses) may be made available. Pricing based on guaranteed availability as well as opportunistic availability may be offered to users.

Multiple available networks may be used to move data and code. The availability and proximity as well as other network performance data may be weighed to make the determination.

Referring now to FIG. 1, a high-level block diagrammatic view of a content distribution system 10 is set forth. In this example, a communication system provider 12 is a system that is in communication with a wide-area communication network 14 and controls the operation of the communication network 14. The communication network 14 is in communication with one or more network clouds 16. The communication network 14 may be in direct connection with the communication system provider 12 or to the internet 18. The communication system provider 12 controls the schedule and placement of content through the communication network 14 using a placement metric. The communication system provider 12 may receive content from various sources as will be described further below. The communication network 14 may have a wireless communication network 14A comprising various components described below and/or a wired communication network 14B.

The communication network 14 is in communication with the internet 18. The communication network 14 may be a single stand-alone network or may be a combination of different networks or even different types of networks. The communication network 14 may be wireless. The communication network 14 for communicating content between the network clouds 16 and local clouds 20. The local clouds 20 may be disposed in various locations in but not limited to a home 22A, a venue 22B, an enterprise 22C and a vehicle 22D. While the home 22A is illustrated all of the other locations may be similarly configured. That is, the local clouds 20 may include a home network, a venue network, an enterprise network or a vehicle network.

The network cloud 16 and the local cloud 20 are comprised of various devices for processing/computing, network control and storage of data. Collectively, the local cloud 20 may be referred to as a local cloud device. Likewise, the network cloud 16 may also be referred to as a network cloud device. The network cloud 16 and the local cloud 20 may be formed of a number of devices that include network control, computing and storage. The computing may allow processing to take place for executing various codes. The storage device stores various data either temporarily or permanently. The storage may include a personal data storage and added storage that are included within the storage.

Each location 22A-22D may include a local area network 24 that communicates with one or more user devices 26. The local area network 24 may be Wi-Fi, Bluetooth® or the like. Further interaction of the components will be described below.

The communication network 14 may include a satellite 30 that has one or more transponders 32 therein for receiving and communicating content therefrom. The satellite 30 may also include a receiving antenna 34 that is in communication with an antenna 36 of the communication system provider. A transmitting antenna 38 communicates content to an antenna 40 of the local could 20, network cloud 16 or the user device 26. The antennas 34, 36, 38 may represent multiple antennas or multiple types of antennas. The satellite components may be referred to as a satellite network.

The communication network 14 may also include a cell tower 42, or any other wireless transmission device, having an antenna 44 (or antennas) thereon. The antenna 44 may represent a cellular antenna, a Wi-Fi antenna, or any other wireless transmission antenna of the cell tower 42 and may communicate content wirelessly to the local cloud 20, the network cloud 16 and the user device 26.

The communication network 14 may also include a television network comprising a television tower 46 having an antenna 48 thereon. The TV tower 46 may communicate content to the local cloud 20, network cloud 16 or user device 26.

The communication network 14 may communicate using real-time capacity, dormant capacity, or a combination of both as will be further described below. The dormant capacity may include various types of resources that are not being used for serving users' real-time/live voice and data requests and their real-time/live voice and data consumption, and that are more ideally used for pre-positioning of content may communicate content to the local cloud 20 or network cloud 16. As mentioned above, the communication network 14 may effectively distribute (pre-position) content on real-time or a non-real-time basis to the local cloud 20, for subsequent consumption by users directly from the local cloud 20.

The communication network 14 communicates to the network cloud 16 and the local cloud 20. The local cloud 20 may communicate content to a local area network 24, which would, in turn, communicate the content to the user devices 26 using various types of access systems so that a maximum amount of content may be provided to the various user device 26. The local area network 24 may be but not limited to Wi-Fi, Bluetooth®, coax such as multi-media over coax (MoCA), Ethernet, cable, etc. The communication network 14 may use frequency division multiple access, time division multiple access, spatial division multiple access, code division multiple access and orthogonal frequency division multiple access. Depending upon the requirements of the system and the types of systems provided, different types of access protocols may be used.

The content distribution system 10, 50, 52 are a plurality of controllers that are programmed to perform various functions. The content distribution system 10 may be a centrally located device or devices that are programmed to perform the functions. However, a personal cloud content distribution system 50 may be in communication with the local cloud 20 at the particular location. The personal cloud content distribution system 50 and the functions that is programmed to perform are described in further detail below. In general, the personal cloud content distribution system 50 may control the storage location of different content generated at the user devices 26. The personal cloud content distribution system 50 may also control the communication with a network cloud content distribution system 52. The network cloud content distribution system 52 is in communication with the network cloud 16. The network cloud content distribution system is microprocessor-based and is programmed to perform various functions including the movement of content to and from the local cloud 20. Of course, the overall content distribution system 10 may control various functions and cooperate the functions between the personal cloud content distribution system 50 and the network cloud content distribution system 52.

In general, the content distribution system 10, the personal cloud content distribution and the network cloud content distribution system 52 may be used to pre-position content and move content from the local cloud to the network cloud as described in more detail below. The communication of content from the local cloud to the network cloud 16 may be referred to as the uplink direction. The communication between the network cloud 16 and the local cloud 20 may be referred to as the downlink direction. The system may also be used for distributing content in real-time live or stored content using the communication network 14. The wired network may be a DSL network, a cable network or a fiber network.

The cell tower 42 may use LTE technology or other cellular technology. In particular, the cell tower 42 may use LTE-B technology to communicate between the local and network clouds in both directions.

The connection between the communication network 14 and the internet 18 or the communication system provider 12 may also use dormant capacity. The dormant capacity may be utilized by the system in a similar way as the afore described dormant capacity, to distribute pre-positioned content to the communication network 14 or to the internet 18, for the distribution of the pre-positioned content, including using dormant capacity, to ultimately reach the local cloud and network cloud.

More than one of the systems and devices illustrated in FIG. 1 may be incorporated into a system. In fact, more than one system or device is likely whereby it encompasses a broad geographic area.

Figure 2:
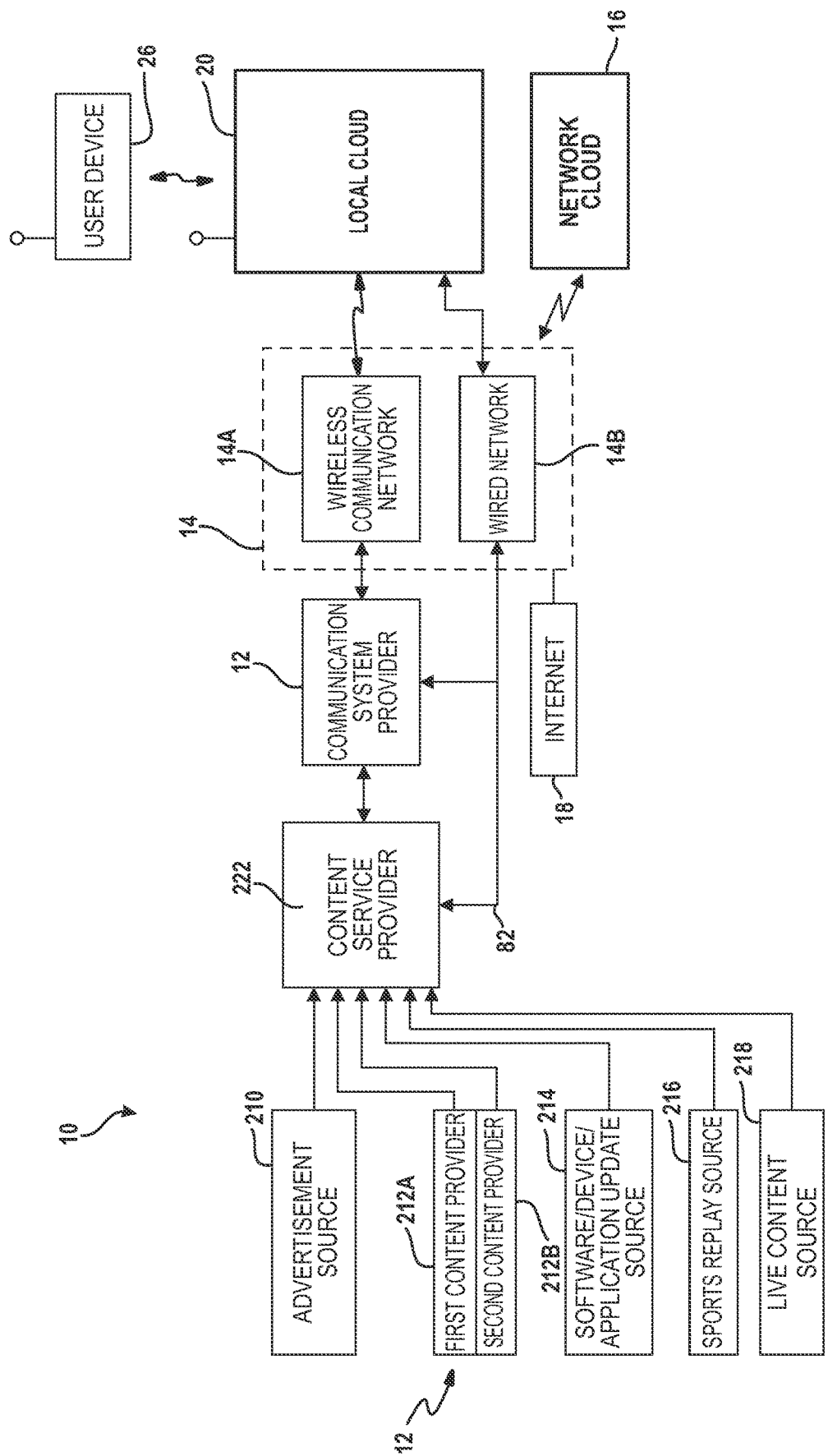
FIG. 2 is a detailed block diagrammatic view of the content sources for the content distribution system of FIG. 1.

Referring now to FIG. 2, further details of the content distribution system 10 and details of the content being distributed are shown. The communication system provider 12 may be more than one entity. The communication system provider 12 is shown as a first content provider 212A, a second content provider 212B communication with a content service provider 222. The content service provider 22 is a system that is used for providing content to the communication system provider 12. The content service provider 222 and the communication system provider 12 may be business entities. The content service provider 222 may purchase the dormant capacity of the communication system provider 12. The content service provider 222 may be a service provider that is subscribed to by the users of the user device 26. However, the content service provider 222 may include pre-existing services such as mobile phone service providers, cable providers, digital television providers and the like. The content service provider 222 communicates various instructions to the communication system provider 12 so that the content is distributed in a desirable way. In one example, stored content is communicated with bit rate data or metadata corresponding to the speed the content is recorded or to be played out so that the desired communication speed for real-time consumption is provided. By the communication system provider 12. Details of the intercommunication between the systems are described in further detail below.

The content service provider 90 may receive content from various sources including an advertisement source 210, the first content provider 212A, the second content provider 212B, a software/device/application update source 214, a sport replay source 216 and a live content source. The advertisement source 210 may communicate advertisements to the content service provider 222. The advertisements may include video, audio and metadata associated therewith. The metadata associated with an advertisement may include desired targets for which users would find the content desirable. Metadata may also include content identifiers and a product definition.

The content providers 212A and 212B may also provide video and audio content as well as metadata for the content. The metadata may include the content title, actors or actresses, and various other identifying data including various categories such as genres and the like. The content may be requested from the content providers or indicated to be pre-positioned at the local clouds or network clouds by the content providers.

The software/device/application update source 214 may provide new software, software updates, device updates and application updates to the local clouds or network clouds through the content service provider 222 and the communication system provider 12, intended for the user device. The updates may be incremental changes to software resident in a user device, whereas the new software may be software not currently within the user device, local clouds or network clouds. The software and updates may be requested by a device for non-real-time delivery or delivered through no action of the device and pre-positioned at the local clouds or network clouds based on the identity of the user device, the software or the applications residing thereon.

The sports replay source 216 may provide sports replays to the content service provider 222 for distribution to the network cloud 16, the local cloud 20, or both. The sports replay content may be short video clips of certain special or important events of a game or match. Sports replays may be clips that include both audio and video content. The sports replay may also include metadata that identifies the team, the players involved, the sport, the clip or replay display title and the like. The clip display title is what may be displayed to a user in a user interface.

A live content source 218 may also be included with in the system 10. The live content source 218 may provide live or real-time content that is broadcasted by the system. Real-time or live content may also be unicasted. The live content is communicated in a live content stream and has various characteristics including a playout bit rate. The live content stream may be played back or viewed in real-time at various user devices, local clouds or network clouds. As will be described below, other devices may receive a unicast of the live content as well. Preferably, the content or stream may be communicated with at least the bit rate at playout. Details of a mix of broadcast and unicast for communicating content is described in detail below.

The content providers 212A, 212B, the sports replay source 216 and the live content source may also provide data or instructions to communicate certain content to specified devices. Metadata included with the various types of content described above allows the content to be distributed to the proper cloud device on the right schedule while accommodating any other content distribution priorities while using the dormant capacity of the communication network under the control of the communication system provider 12.

As will be described in further detail below, the wide area communication network 14 is used to communicate between the local cloud 20 and the network cloud 16. Details of the local cloud 20 and the network cloud 16 are provided in further detail below.

Figure 3:
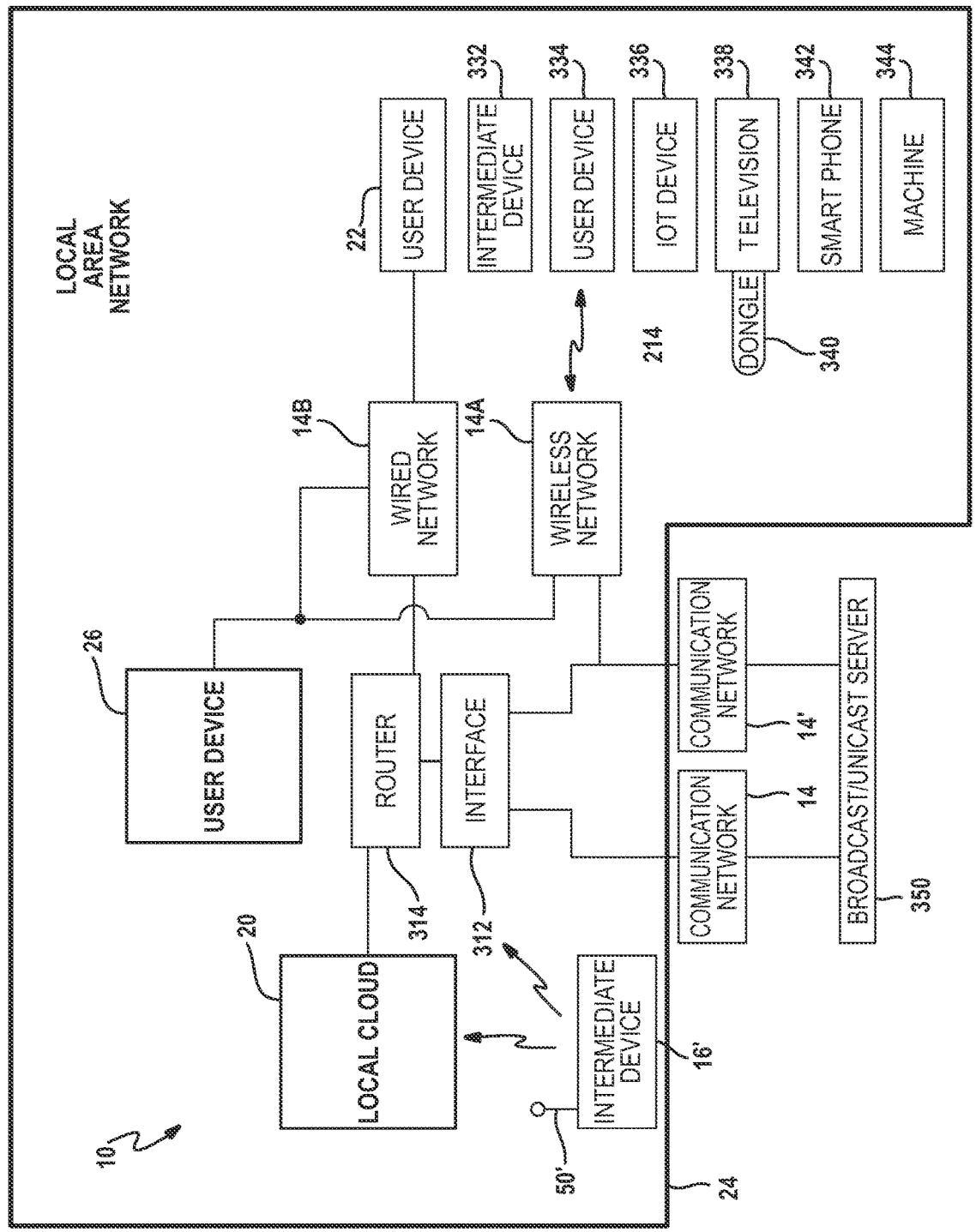
FIG. 3 is a high-level block diagrammatic view of one example of a local area network.

Referring now to FIG. 3, the communication system provider 12 may be in communication with the local area network 24 through the wide area communication network 14 as described above. The local area network 24 may have an interface 312 for communicating with the communication networks 14. The interface 312 may be a modem.

The local area network 24 may also be coupled to a second communication network 14'. The second network 14' may be the primary two-way connection to the Internet for the user devices 26 and 332-344. An intermediate device 332 may be incorporated into the local area network and may be part of the local cloud and include compute, storage and networking capacity. The second network 14' may represent dial-up or a digital subscriber line. As described in the examples set forth herein, the system 10 may be used to pre-position content in the network cloud 16 or a user device 26, 334-344. The supplementation of content is particularly useful when the second communication network 14' for providing regular internet service to the user devices 332-344 is slower than the speed of the communication network 14, although not necessarily. It is possible that the local area network 24 may not have a two-way connection to the internet except the pre-positioned content received through the communication system.

The local area network 24 may also include a router 314. The router 314 may be used for connecting the local cloud 20 with user devices 26, 332-334 within the local area network 24. The use of the router 314 may be referred to as an indirect connection because to the communication through the router 314. The local area network may provide both a wired network 316 and a wireless network 318. Various devices may take advantage of each method of communicating. As mentioned above a number of routers 314 may be associated with a local area network.

The user device 26 may be coupled to the local area network 24 through either the wireless network 14A or the wired network 14B. The user device 26 may also communicate directly with other user devices directly using Bluetooth®, near-field communication (NFC), Zigbee® or other short range communication device.

As mentioned above, the user devices 26 may be various types of user devices including a cellular phone or smartphone, a tablet, a laptop, a TV or the like. The user device may be referred to later collectively as the user device 26.

An internet of things (IoT) device 336 is a type of user device that may also be coupled locally to the local area network 24 through the wireless network 14A or wired network 14B. The IoT devices 336 may require software and application updates suitably delivered via dormant capacity.

A television 338 is a type of user device that also may be coupled to the local area network 24 through the wireless network 14A or wired network 14B. The television 338 may be a smart television for directly coupling to the wireless network 14A or the wired network 14B. However, the television 338 may also require a dongle 340 that is used for communication with the wireless network 14A. The dongle 340 may have an application therein for providing the television 338 with a graphical user interface. The dongle 340 may also include a content storage for storing content therein. The dongle 340 may also be used for receiving and storing content.

A smartphone 342 is a type of user device that also may be in communication with the wireless network 14A or wired network 14B so that access to the local area network 24 may be obtained.

A machine 344 is a type of user device that also may be in communication with the local area network 24 through the wireless network 14A or wired network 14B.

All of the user devices 332-344 may be in communication with the wireless network 24 using many different types of standards including Bluetooth and Wi-Fi. The application code for retrieving and serving content to the user devices 332-344 may be in the devices 332-344, in the local area network 24, in the router 314 or in the interface 312. The user devices 330-344 may also have content storage incorporated therein.

The types of content may include audio content, video content, operating system updates, other software updates, applications, weather information, "best of web" content and e-delivery of various materials. The users of the user devices 332-344 may each obtain the various types of content from the content service provider or other user devices. The content may be obtained individually or simultaneously from the content storage 60. As will be described below, the user devices 332-344 may provide an inventory list or a list of desired content that is communicated through the local area network 24 and ultimately back to the communication system provider 12 of content service provider 222 illustrated in FIGS. 1 and 2. The communication back may be performed with either the communication network 14 or 14'.

A broadcast and unicast server 350 may be coupled to the communication networks 14, 14'. The broadcast server 350 may be used for broadcasting content to various user devices 26 or the local clouds 20. The broadcast and unicast server 350 may broadcast content that is stored or provided by a content provider or source. The broadcast and unicast server 350 may also communicate content in real-time that is live. The broadcast and unicast server 350 is a network component that manages broadcast sessions across a multiplicity of networks. The distribution system may identify to the broadcast server the preferred network to be used for the broadcast with an identifier signal having a network identifier.

The broadcast and unicast server 350 may also unicast content to user devices and local clouds. The broadcast and unicast server 350 may determine how to communicate based on various data including but not limited to how popular an object or content is, the demand, the future demand, the cost of delivery and the timeliness of the communication. Broadcasting is a communication received simultaneously by many, while unicasting is directed to a single destination such as a user or local cloud.

Figure 4:
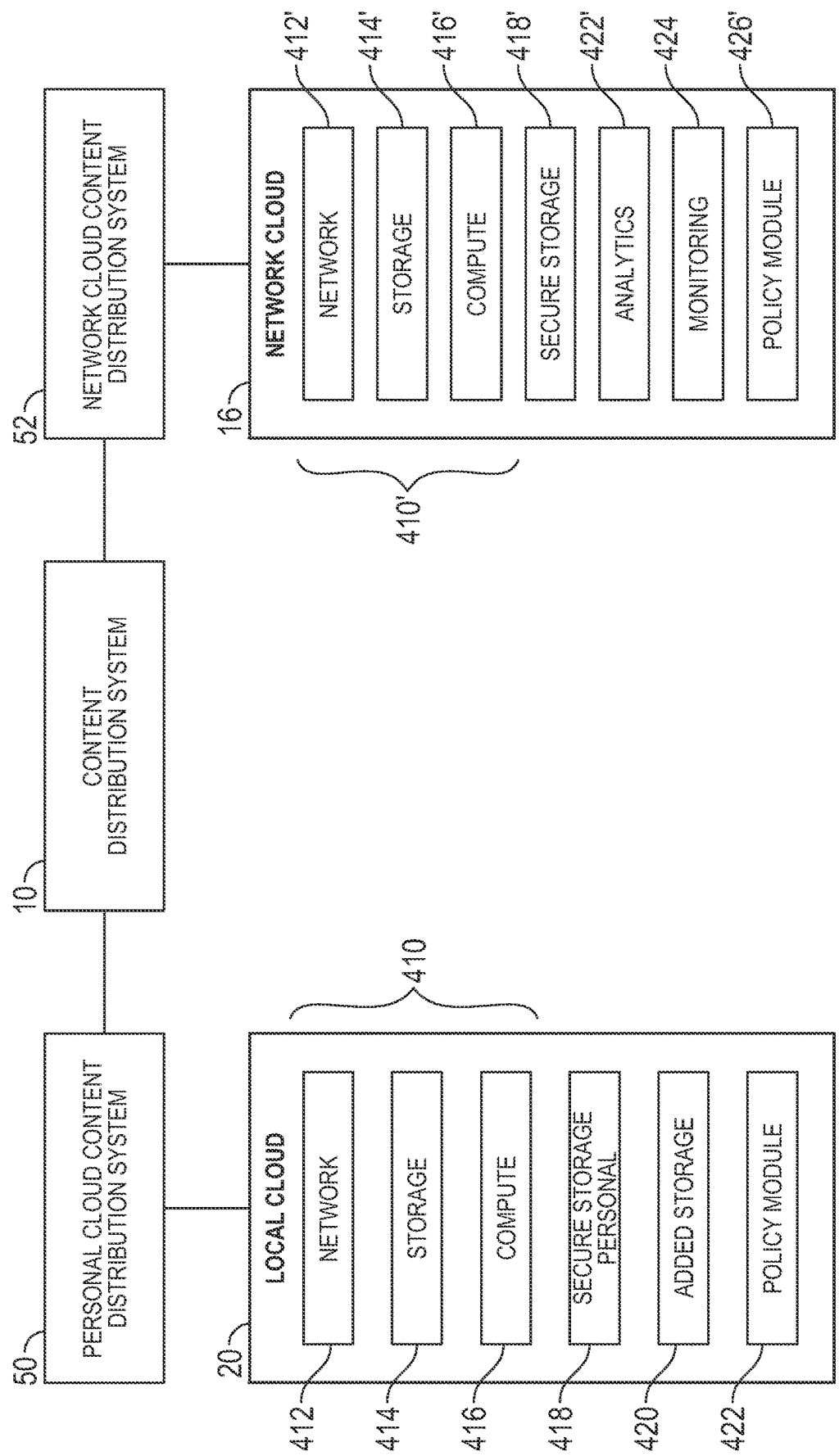
FIG. 4 is a more detailed block diagrammatic view of the local cloud and the network cloud.

Referring now to FIG. 4, the content distribution system 10 is shown relative to the personal cloud distribution system 50 and a network cloud content distribution system 52. The local cloud 20 and the network cloud 16 are illustrated in further detail. The local cloud 20 has a plurality of types of resources that may be considered distinct resources. The local cloud 20, as mentioned above, may be referred to as a local cloud device. However, the local cloud 20 may be formed of a plurality of devices or servers that intercommunicate as a plurality of types of resources that are used within the system. The same resources in the network cloud are shown with a prime number and therefore will not be described separately. Although the personal cloud distribution system 50 and the network cloud content distribution system 52 are shown outside their respective clouds, in practice they may be within their respective clouds.

The types of resources 410 in the system may be considered three distinct resources. The resource types that can be optimized to deliver the desired results. The types of resources 410 included are the network resources 412, the storage resources 414 and the compute resources 416. The resources 410 may span different positions in the system and may include different types of resources. Each of these resource types can be optimally allocated in and of themselves.

The use of network resources 410, 410' and the timing thereof, in and of themselves, may be optimized in various ways between the local cloud 20 and the network cloud 16. The best network, compute, or storage may be chosen to deliver networking to the user, if the user or device is accessible via multiple paths based on the performance of such systems relative to the time of day. The cost of using the network, compute, or storage may also be considered. Aggregating bandwidth across multiple networks, computes, and storages (pathways available to the user) may allow multiple paths to be used simultaneously. Harvesting underutilized or dormant networks, computes, or storage capacity, e.g., using paths when regular use is low, on a consistent basis allows a cost-effective use of the network resources. The mode of transmission to use during the communication of content may be chosen to use the network resources more efficiently.

In the network described herein, the available storage and compute power of wireless-connected devices such as the network cloud 16 and the local cloud 20 are tracked by the system, and the wireless network is constantly transmitting data, and determining whether to serve requests by users for real-time consumption or to pre-position data into the available storage of wireless-connected devices. The wireless network is constantly determining whether content should be moved from one device to. another device, from the network cloud to the local cloud or from the local cloud to the network cloud. Using the remnant or excess capacity for non-real-time consumption, based on such a likelihood of a device being able to fulfill the greatest number of applications' requests for real-time consumption in the future, or based on its likelihood of being able to fulfill the most valuable real-time consumption requests in the future, including during the most valuable time for such fulfillment (instead of using the wireless network at such time for real-time consumption). When applications are making requests for real-time consumption, the network figures out whether fulfilling such data requests is better directly from a nearby available storage containing the requested data or instead using the wireless network for transmission of such data and directs such application to receive such data from either the nearby available storage or from the wireless network itself.

The storage resources 414, in and of themselves, can be allocated in optimal ways to ensure cost and performance optimization, and economies of scale. Typically, greater economies of scale (and cost efficiencies) may be gained by storing deeper in the network (e.g., on arrays in the cloud). Deeper is relative to the end user or user device.

While storage space may normally be more limited and expensive in local clouds and end user devices themselves, a strategy that harvests unused (dormant) storage capacity in these devices (with resultant lower costs or no costs) can make sense, especially when storing closer to the user makes the delivery process more cost/performance optimal. This can be both for their own benefit, and for the benefit of nearby devices which can be served from those end user devices' storage.

The available storage of devices may be filled with partial data of any given content. In this case, the network could direct an application to access one part of the data from one device with the partial pre-positioned data, and to access another part of the data from another device with the remaining partial pre-positioned data.

Even for a given bundle of content, pieces of the bundle can be stored at different places in the system. For example, in the case of streamable multimedia, metadata, content guides etc. can be stored locally on the local cloud 20 in the home, or on an end user device, whereas the main content could be positioned at some point in the system.

As in the case of storage, computing locations (the compute 416) can also be selected in a distributed fashion and aligned with where different content pieces get stored. The compute refers to the applications and hardware to process or move content toward the endpoint. The computing locations may perform interactions with end users that generate data to be stored. Unused/dormant compute capacity can be tapped into at different points in the system. As in the case of the storage resource 414, the capacity of the compute 416 can also be leveraged in a "split" fashion, e.g., in the case of an online, multiplayer game, components related to rendering and local processing can undergo processing on the local device; whereas functions common to all the players, and which relate to the overall game status, could execute deeper in the network.

The local cloud may also include secure storage 418 while the network cloud may include secure storage 418'. Secure storage 418 may be associated with a particular user or user device or devices. The secure storage may store various types of data including various types of personal data that is not to be shared with any other devices. The secure storage 418' within the network cloud 16 may be designated for a particular user device or user. Within the network cloud 16, several secure storage areas may be therein. For example, the secure storage 418' may be associated with a user device by a user device identifier. Likewise, the local cloud 20 may also be associated with a particular user or user device identifiable by a user identifier.

The local cloud 20 may also include added storage 420. The added storage 420 may be added to the local cloud 20 upon demand or upon analyzing the user of the storage. In one example, the added storage 420 may be physical storage that is physically added to the system by the user. The system may also have virtual storage as the added storage 420.

The network cloud 16 may also include an analytics module 422. The analytics module 422 may monitor the various user devices to make various conclusions about the use of data, the expected frequency of use of data, a low frequency of usage and the like. The analytics may allow the content distribution system 10, the personal cloud content distribution system 50 or the network cloud content distribution system 52 to determine the placement metric for placement of or movement of content within the system.

The network cloud 16 may also include a monitoring module 424. The monitoring module 424 monitors the use of the data as well as monitoring other users. As will be described below, similar users may use content in a similar way. Therefore, various attributes can be used to forecast the use of content by another user. The likelihood of a user device and the timeliness of the use may be determined from the monitoring module 424. The change in placement of the content from the local cloud 20 and the network cloud 16 may be determined by a placement metric determined from the monitoring data in the monitoring module 424 and analytics provided by the analytics module 422 from the monitoring.

A policy module 426 in the local cloud 20 and policy module 426' in the network cloud 16 is used to establish various rules in deciding whether to move content from the local cloud 20 to the network cloud 16 or from the network cloud 16 to the local cloud 20. The policy module 426 may have a placement policy or rules established or controlled by the user through the user device 26, the content service provider 22, the communication system provider 12 and the provider of the content distribution system 10. The operator of a user device associated with the local cloud 20 may also establish various rules for particular types of content. Rules may also be established over time using artificial intelligence or machine learning for certain types of content and how they are used. Certain types of content may include personal data and when that data is within the system to store the data within the secure storage 418, 418'. Based on a policy to secure the first object in the local cloud or network cloud such as security and privacy requirements such as geofencing content may be communicated between the clouds. The policy to secure is a type of placement metric, more of which will be described below.

Figure 5:
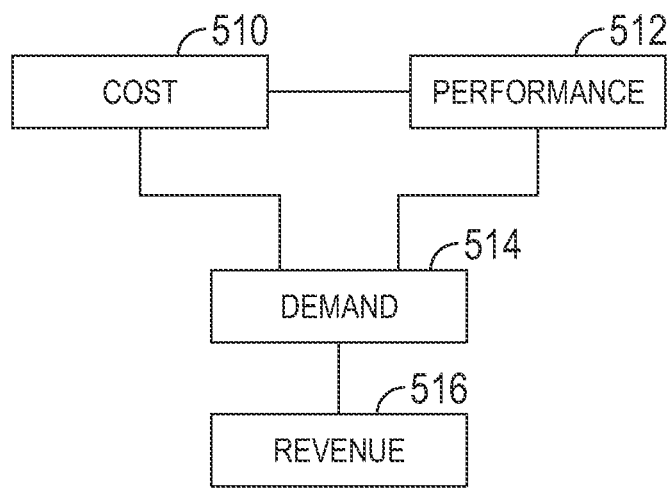
FIG. 5 is a cost performance to revenue chart.

Referring now to FIG. 5, the different resource types 410 (network 412, compute 416 and storage 414) can also be combined in a cohesive manner to deliver a cost 510, a performance 512 service that is optimized based on demand 514 to meet the requirements of the user or service in question. Ultimately, revenue 516 is provided by such a system.

Figure 6:
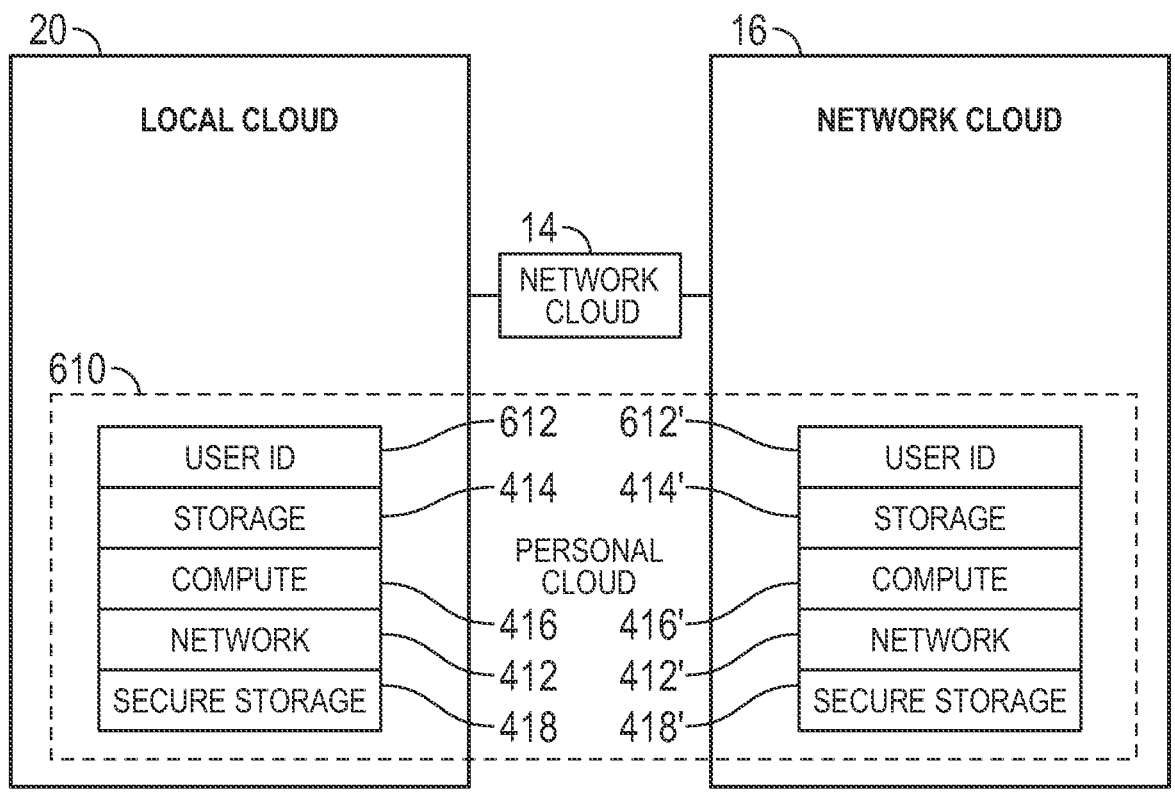
FIG. 6 is a detailed block diagrammatic view of the personal cloud of the communication system.

Referring now to FIG. 6, a simplified block diagrammatic view of a personal cloud 610 is illustrated. The personal cloud extends through the network and includes components of both the local cloud 20 and the network cloud 16. As mentioned above, the local cloud 20 includes the network 412, storage 414 and compute 416. Likewise, the network cloud 16 includes the network 412', storage 414' and the compute 416'. However, the personal cloud 610 is associated with a user device. Therefore, the components or the portions of the components within the local cloud 20 and the network cloud 16 are associated with a user identifier. The user of the user device may be required to be authenticated in order to access various components. At minimum, the user identifier is used to identify storage 414, 414' associated with a user. A user ID 612 and 612' are illustrated associated with the components 412-416 and 412'-416'. Secure storage 418 and 418' are also associated with the user IDs 612 and 612' respectively within the local cloud 20 and the network cloud 16. By associating all of the network, storage, compute and secure storage components with a user identifier, security of the system is ensured.

Figure 7:
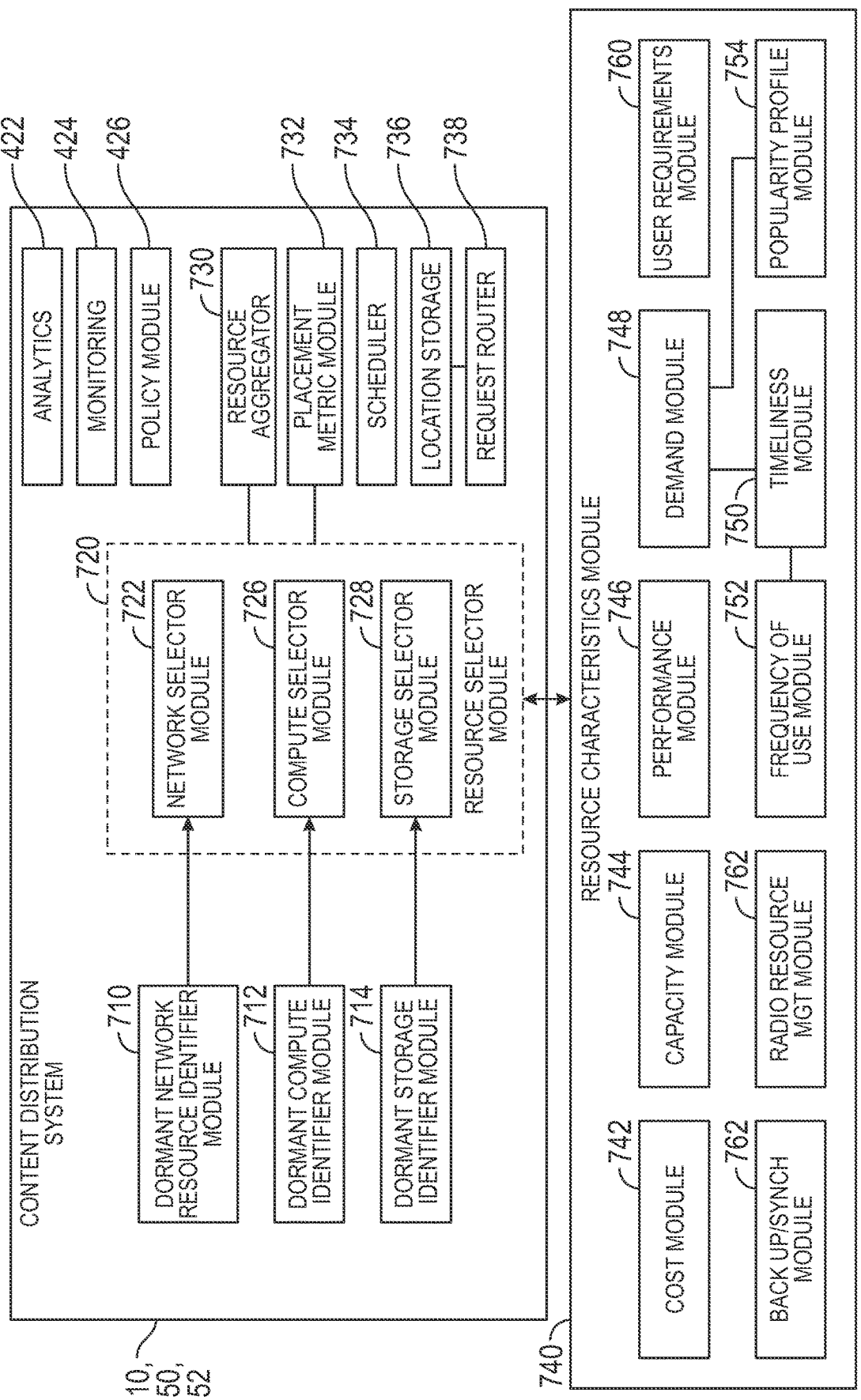
FIG. 7 is a detailed block diagrammatic view of a content distribution system and a resource characteristics module.

Referring now also to FIG. 7, the content distribution system 10, personal cloud content distribution system 50 and the network cloud content distribution system 52 are illustrated in further detail collectively. The content distribution systems 10, 50, 52 may be different systems or one system in implementation. The content distribution systems 10, 50, 52 determine a combination of the compute, storage and network resources to use to communicate and move content between the local cloud 20 and the network cloud 16 and store the content therein. In this example, the system includes a dormant network resource identifier module 710, a dormant compute identifier module 712 and a dormant storage identifier 714. Probe signals may be generated at the content distribution systems 10, 50, 52 to obtain the network communication resources that are dormant, the compute resources that are dormant and the amount of storage that is dormant within the communication system. Each of the modules 710-714 may generate a probe signal. However, one probe signal may be sent for determining all the dormant resources within the network as provided in this example.

The dormant resource network identifier module 710 identifies dormant capacity, which is capacity available outside of the capacity that is required to serve a similar type of traffic that is increasingly served during peak network use. Dormant storage capacity can also be capacity available for content pre-positioning and within their content storage and subsequent consumption of that content by users directly from the local cloud, and which is not the capacity required for real-time voice and data requests from users or for distribution of content to users and for its immediate consumption. To identify dormant network capacity user demand patterns of the "primary, non-dormant" network may be reviewed. Dormant network capacity may be automatically identified on a real-time basis by receiving information as to the amount of network not being consumed for "primary, non-dormant" use. The identified capacity may be automatically provisioned for use as the dormant capacity in response thereto. "Primary, non-dormant" capacity may run in parallel to "dormant" capacity use such that both are running across the entirety of the resource the entirety of the time but assigning a lower QoS value or identifier to the dormant capacity use so that dormant capacity is only used whenever such resources are not being used by a higher QoS "primary, non-dormant" use such as cellular, television broadcast, cable satellite and the like.

The dormant content delivery system may also be used for delivering device, software and application updates that are associated with the user devices within a local cloud. An inventory list may also include device identifiers, software identifiers and application identifiers. The inventory list may also list the devices associated with the various software and applications.

The dormant network resource identifier module 710 is used to harvest unused or dormant capacity in networks so that content may be stored in the local cloud 20 close to where the user consumes the content using an unconstrained medium, such the local area network 24 (Wi-Fi, Ethernet etc.). In the example set forth below, dormant network resource identifier module 710 manages dormant radio resources in a wireless cellular network. However, the teachings are equally applicable to other types of networks, such as satellite systems or combinations of different types of networks such as those described above.

The content distribution service of interest (referred to herewith as "service") uses inputs from the dormant network resource identifier module 710 to determine how much data can be delivered and pre-position content using dormant capacity. The goal is to leverage as much of dormant capacity as possible, without contending with regular network traffic at all. The dormant network resource identifier module 710 continually adjusts its operational parameters and capacity usage targets, based on metrics received from the networks 14 to provide elastic dormant capacity management. The desired dormant capacity may vary by time of day and may be determined by input from the operator of the communication system provider 12. For example, at certain times of the day more dormant capacity may be used as a buffer, such as in rush hour, than other times of the day such as after in the overnight hours.

The dormant network resource identifier module 710 uses reports from a reporting application interface (API) the network 14 on resource usage to determine network capacity usage and hence estimate available dormant capacity. The network capacity may be calibrated when no service data is being communicated. This may be performed at various times. In an exemplary cellular network, the reports are communicated using report signals and may provide data, for example, on physical resource block (PRB) usage within the radio network, received from the network 14 on a per-cell basis. In a cellular network, PRB usage is most effective as a capacity usage measurement metric, since it gives a concrete view of how much of a radio capacity of a cell is being used. The dormant network resource identifier module 710 uses the metrics to determine the rate at which the service provider can deliver data to devices through the network 14.

The dormant network resource identifier module 710 uses resource usage reports to determine the total usage level in the network 14 (referred to herewith as "total usage"). The dormant network resource identifier module 710 also determines, from the report data, the level of the capacity of the network being used by regular traffic (e.g., in a wireless network, the percentage of a cell's radio resource blocks used by regular traffic). The regular capacity associated with the communication system provider is referred to as herewith as "regular usage". The dormant network resource identifier module 710 then determines the maximum dormant capacity (in this example, in terms of the percentage of network resources) available for use. This is the available dormant capacity, which may be expressed as the percentage of the total or overall system capacity and is referred to herewith as a maximum dormant capacity) Max Dormant Capacity.

An upper bound can be used for the Max Dormant Capacity. For example, a 70% threshold could be employed, which means that the dormant network resource identifier module 710 will seek to maintain total usage within 70%, while staying as close to that upper bound as possible. In this example, the total usage amount is referred to as the "total usage threshold". Of course, absolute units of capacity may be used. By setting the threshold in this manner, sufficient buffer room in the network 14 accommodates sudden spikes in regular usage.

The upper bound provides a "breathing" or elasticity mechanism. That is, the increases or decreases of the network load are continuously monitored so the level of dormant capacity is continuously calibrated. The service provider 90 utilizes changing dormant capacity to the fullest extent possible while not causing contention with regular network traffic or creating disruptive traffic spikes. The maximum dormant capacity may be expressed as Max Dormant Capacity=total usage threshold−regular usage The dormant network resource identifier module 710 also uses the network reports to estimate the level of usage of network resources by a service provider. In an exemplary cellular network, service usage would signify the average instantaneous percentage usage of a cell's capacity. The dormant network resource identifier module 710 measures the actual throughput (amount of data over time) achieved by each device or cloud that receives a delivery during the reporting period. Service usage can either be reported explicitly by the communication network 14 or can be estimated by dormant network resource identifier module 710 from total usage and regular usage, e.g., service usage=total usage−regular usage. If the communication network 14 reports to the DCCP system 1008 the total usage and regular usage for a reporting period, service usage can be accurately determined.

If only total usage is reported by the communication network 14, the dormant network resource identifier module 710 can estimate service usage in one of two ways. In the first way, a previously reported (by the communication network 14) accurate value of regular usage and subtracting this from total usage. This assumes that regular usage in the communication network has remained at that previously reported level since that reporting period. Regular usage may be determined by periodically measuring regular usage by deliberately not running service traffic (data) over defined intervals of time, and then measuring total usage during those periods. For those periods, regular usage=total usage. The periods of no service traffic may be referred to as Quality Control Gaps or (QC) Gap. The second way of determining service usage may be performed by applying that the system was attempting to target total usage at a level of (Max Dormant Capacity used in the current period+ the previous period's regular usage), and using the delta ($\Delta$) between actual total usage (reported for the current period) and this target to estimate regular usage and service usage. For example:

Delta ($\Delta$) (for this reporting period)=total usage−(Max Dormant Capacity used in Current Period+Previous Period's regular usage)

regular usage (for this period)=regular usage (previous period)+Delta*<Factor-1, e.g., ½> service usage (for this period)=Max Dormant Capacity used in Current Period+Delta*<(1-Factor-1), e.g., ½>

The "Max Dormant Capacity used in current period," in turn, is estimated based on the Max Dormant Capacity value determined at the end of the prior cycle, i.e., the Max Dormant Capacity target coming into the current cycle. This number is adjusted downwards, based on downtimes in the current cycle when deliveries did not occur, and based on any throttling the Network might have done. The premise is that the system went in with a Max Dormant Capacity target, and the assessed dormant capacity usage is lower if either the full delivery cycle was not leveraged, or if a lower throughput than target was achieved (throttling). Also, if during the current delivery period, if updated capacity reports were received from the network that resulted in the Max Dormant Capacity value being modified, a weighted average Max Dormant Capacity value (based on the various Max Dormant Capacity values used during different deliveries in this period) can be used.

The idea is that the usage delta is being "debited" to both regular usage and service usage. On one hand, the Delta is being (at least partially) attributed to regular usage having increased or decreased relative to the last accurately measured value. At the same time, the Delta is being (at least partially) added to or subtracted from the value of Max Dormant Capacity, which is being used as the target capacity having been used by the Service, i.e., asserting that the Service has used more or less dormant capacity than was targeted.

With this approach, regular usage and service usage gets cumulatively adjusted period-to-period, based on the delta. This also means that Max Dormant Capacity is adjusted period-to-period, since Max Dormant Capacity=total usage threshold−regular usage.

The approach serves to continually adjust the operational settings of the dormant network resource identifier module 710 to counter spikes and dips in network capacity usage driven either by increases in regular network usage or service usage.

Throughput targets are set based on dormant network resource identifier module 710 learned correlation between achieved throughput and resource usage. Dormant network resource identifier module 710 uses prior measurements of achieved throughput and resource utilization to establish a throughput to usage ratio. The dormant network resource identifier module 710 then uses this ratio, in conjunction with available dormant capacity, to set and throttle throughputs.

A resource selector module 720 is used for selecting the resources for storing the content, communicating the content and processing the content. The resource selector module 720 includes a network selector 722 for selecting the network or networks through which the content is communicated between the local cloud 20 and the network cloud 16.

A compute selector module 726 is used for selecting the compute to be used for processing the data or executing code. The compute may comprise the program or programs for applications used for storing the content or communicating the content to the end user.

The resource selector module 720 may also include a storage selector module 728. The storage selector module 720 selects the location for storing the content such as in the local cloud. The storage selector module 728 may also select whether the content should be placed in the secure storage 418, 418'.

The determination of the resources is determined for a particular time in the network whether it is for content storage, for distribution between the local cloud 20 and the network cloud 16 or for processing using a network or local compute resource. A particular time may be selected for distributing the content. In certain situations, a time may be chosen for better use of various system, network, compute and storage resources.

It should be noted that the network selector module 722, the compute selector module 726 and the storage selector module 728 may select different resources from different parts of the network.

The content distribution system 50, 52 includes a resource aggregator 730. The resource aggregator 730 selects the network, compute and the storage resources for communicating content to the storage or communicating the content from the storage to the end user device. The resources, as mentioned above, may be aggregated from different positions within the network.

A placement metric module 732 is used by the resource selector module 720 to determine when to communicate the object. By determining a placement metric, the object is communicated according thereto. Details of various placement metrics are set herein. In general, communicating the object may take place upon the identification of a placement metric or when the placement metric changes. In one example, the placement metric is a likelihood of the user device using the first object and a timeliness of the likelihood of the user using the first object.

The content distribution system 10, 50, 52 may also include a scheduler 734. The scheduler 734 may generate a schedule for the time to communicate content from the network cloud to the local cloud or from the local cloud to the network based on various conditions as described more thoroughly below.

A location storage module 736 provides list or table of storage locations for various contents stored within the system. The content may also be divided into content portions that may be stored in different location. As will be described below the content may be stored in different locations and executed from different locations based on the compute resources available. Likewise, storage and compute locations may be determined based on the bandwidth or network resources available or the dormant capacity available. For example, the location storage 736 may be a database filled with the content stored at the local cloud 20 and the network cloud 16.

A request router 738 receives requests from the local cloud 20 and the network 16 in order to control the movement of data and content between the network cloud 16 and the local cloud 20. The request router 738 may receive a content pull request and may generate a redirection request to the requesting device that includes the actual location of the content as described below.

A resource characteristic module 740 is used for determining the resources at the resource selector module based on various conditions. The resource characteristic module may provide a cost for providing the resource at the cost module 742. The cost module 742 may determine a dollar cost or an opportunity cost for providing content. Although a cost module 742 is illustrated within the content distribution system 50, 52, each of the resources, such as the network, compute and storage, may provide cost data of costs to the content distribution system 50, 52. For example, if the cost of storage in the home is $1, the cost of real-time delivery is $10, and the cost of pre-positioning using dormant capacity is only $2, then the likelihood of video consumption (for example 50%) may be taken into account. The effective cost of real-time delivery compares to a $6 cost (($1+$2)/50%) of pre-positioning and subsequent serving given the likelihood of such an event. Now if this example is expanded, and the cost of pre-positioning using broadcast over dormant capacity is $6 (since less efficient for any 1 user), but 100 users can be addressed by the broadcast, and the likelihood of video consumption is 33% across the group of 100, then the effective cost of pre-positioning and subsequent serving given the likelihood of such an event drops to $3.18 (($1+$6/100)/33%). Finally, if the cost of storage in the home is entirely a sunk cost, and is shouldered by the user, the above costs or pre-positioning and subsequent serving drop further to $4 and $0.18, providing dramatic cost and performance improvements. Another placement metric may be determined by a comparison of a network bandwidth requirement for fetching the first object and, the storage and compute costs for accessing the first object.

A capacity module 744 is used to determine the capacity of the network associated with the communication system and the capacity of the storage that is available throughout the network. A performance module 746 determines the performance of the resources of the system. For example, the performance module 746 may determine the transmission speed of a network, the speed at which the compute can store or execute the content, and the speed that the content storage can store the content. Another placement metric comprises a higher performance experienced by fetching the first object by the first user from the local cloud 20 versus fetching the first object from the network cloud 16. Lower latency, lower jitter, higher bandwidth may be attained from fetching from the local cloud 20 and thus better performance is achieved. Each part or content may include a fulfilment requirement meaning a speed of communication, a processing speed of the compute or an amount of storage (or combinations thereof) for the local cloud and the network cloud may be desired to process or fulfil the objects or object parts. The network cloud efficiency and the local cloud efficiency may be determined by the performance module 746 of the resource characteristic module 740 described above. The local cloud efficiency is based on system bandwidth outweighing a local compute. That is, when processed data will arrive at the user faster if being computed in the compute of the local cloud (faster than computing in the network cloud and communicating the data through the network). The network cloud efficiency is based on the network compute outweighing the system bandwidth. That is, when it is more important for the object to be quickly determined without latency, the local cloud efficiency may be higher. When the network cloud can process the data and still deliver the data based on the network speed faster than processing the data in the local cloud, using the network cloud is preferred (has a higher network cloud efficiency). Sometimes the local or network cloud may not have the compute resources available for processing which slows down the system.

A demand module 748 may determine a demand for a particular content. The demand module 748 may be associated with or determine demand from a wish list for each of the devices within the network. The demand module 748 may determine the likelihood of use for particular content. Demographics, content provider recommendations and previous content use may all be factored into the likelihood of use.

A timeliness module 750 may determine the timeliness of the demand. For example, whether the time that the content may be or is still popular may be determined. The timeliness refers to a time the user is likely to access the content. A time that the system determines may be based on demographics or other input. Timeliness may also be associated the likelihood of use. That is, the likelihood of use may be for a likelihood of use for a particular time period. Thus, another placement metric is a likelihood of the user device using the first object and a timeliness of the likelihood (or lack of timeliness) of the user using the first object.

A frequency of use module 752 may determine whether the content is accessed by the user devices more than once. The frequency of use is another placement metric. For example, a favorite child's movie may be repeated several times and therefore the expected frequency of use is high. Likewise, games and other application or code may be accessed regularly and hence have a higher expected frequency of use. Content with a low frequency of use may be movies that are watched one time or a sporting event that, once watched, becomes irrelevant. The expected frequency of use for the first user may be compared to a usage threshold to obtain the placement metric. When the expected frequency of use is either above or below a threshold the system may move or maintain the object in its position.

A user requirements module 760 may also be incorporated within the resource characteristic module 740. The user requirements module 760 may associate various user requirements with each end user or end user device. The user requirements module 760 may include the definition of the service to which the subscriber has subscribed. For example, some users may value rapid response in terms of updating or providing content. This may signal the content distribution system 50, 52 to locate the content closer to the end user.

A popularity profile module 754 may also be communication with the demand module 748. The popularity profile module 754 may determine a popularity of a particular content. The popularity of a content may be used from audience measurement or from a predictor of popularity as determined by a human entity. For example, the providing of Olympic content during the Olympics may have an increased popularity. On Sundays in the United States, National Football League content may be more popular.

A radio resource management module 762 may also be included in the resource characteristic module 740. The radio resource management module 762 may take into consideration a service resource agreement from various service sources and various service level agreements from the devices and nodes 720-750 in order to determine whether to use a particular resource.

A backup/synchronization module 766 may be disposed within the resource characteristic module 740. The backup/synchronization module 766 may be used to monitor the content stored in the local cloud 20 and the network cloud 16. Synchronizing data between one cloud and the other takes place when proper conditions exist such as storage being available and network capacity is available, e.g., dormant capacity. Content from the local cloud 20 and/or the network cloud 16 may be backed up or synchronized also based on the type of content.

As will be described in, more detail elsewhere, the analytics module 422, the monitoring module 424 and the policy module 426 may also analyze and determine when and if communications between the local cloud and network cloud 16 takes place.

In summary, the content distribution systems 10, 50, 52 determines, for any content to be distributed, the optimum combination of resources to leverage at a particular time. For example, if cost minimization is the prime consideration, positioning content within the local cloud 20 might make the most sense. In this scenario, performance optimization is a natural by-product, since delivering the content close to the user device will maximize throughput and minimize latency and jitter effects.

Using the above determinations, video streaming content can be cached (pre-positioned) in the local cloud 20 for subsequent consumption by the end user device 26 over the local, unconstrained local area network 24 such as Wi-Fi or ethernet. The network cloud 16 orchestrates the smart placement or pre-positioning of video content in the local cloud 20 based on the specific user's prior usage patterns, demographic usage patterns, geographical preferences (other users in the same geographical area) and requests made by the user as determined in one or more content distribution system 50, 52.

Dormant network capacity can be used to cache such content in the local cloud 20 by leveraging capacity that the network operator has already invested in but is unused at different time periods.

Content (e.g., media streams) of interest to the user can be pre-positioned close to the user (i.e., in the local cloud 20) may be based various factors such as popularity metrics from the popularity profile module. Content may be pre-positioned that is most likely to be consumed by a given user in the local cloud 20 associated with a particular user. This may be performed in advance of the user expressing a desire to consume the content based on a variety of popularity factor. For example, content that is highly popular, i.e., that a large number of users are accessing and consuming has a high popularity as determined by the popularity profile module 754. This would typically include very current items of almost a "cult" level of popularity, items that are currently a fad, etc. Highly popular content may also include content that is popular amongst users in a similar demographic to the target user (e.g., age, background etc.). Content similar to (or in the same genre as) other content the target user has been preferring to consume may be popular. Content popular in the same geographic region, e.g., regional movies or shows which may be sporting events or the like. Requests from the user, i.e., the end user specifically requesting some data/content item or placing it in a watchlist may increase the popularity for the user. Further the popularity profile module 754 may render content popular a request from a partnering content provider, which directs the content distribution system 10 to position the content within the user's local cloud 20.

Post-positioning is when the end user has requested to consume or access a specified item, which is not available in the local cloud 20 and the content is then fetched from the network cloud 16, or from origin servers, and served to the user. The content may get stored or cached in the local cloud if it is determined to be of continued interest to the user, i.e., if the user is deemed to be likely to repeatedly access the content.

Personal cloud systems may benefit from the teachings set forth herein. Existing personal cloud systems are capable of locating content in local and network cloud 16 environments. However, content is moved between local and cloud environments only based on user requests, e.g., a user request to edit a document in the cloud results in the document being downloaded to the local environment. Static settings typically determine what stays in the local and cloud environments.

The system dynamically decides where to locate content, based on multiple factors determined at the content distribution systems 10, 50, 52. For example, content/data that is likely to be accessed by the user near-term can be pre-positioned or maintained in the local cloud 20; this can be determined based on past usage patterns of the same or similar pieces of content. Conversely, content created at the user device and content in the local cloud can be moved to the network cloud 16.

Data generated by an application or service can be seamlessly distributed across different storage locations within the system. Data that is regularly needed by the concerned application can be stored in the local cloud 20, for example. Data that needs to be maintained for historical purposes, auditing and analytics data may be uploaded into the network cloud 16 when favorable network and storage conditions are available.

A similar approach may be taken for user data or content created by the user device 26. The content distribution system 10, 50 or 52 may determine the likelihood of frequent access to the data by the user, and place the data close to the user or deeper within the network. A metric akin to a "content popularity" metric, a frequency of use metric or frequency of continued use, can be used to determine whether the user is likely to frequently access their data, e.g., based on past access patterns to similar data, behavior exhibited by other users in the same demographic, etc.

Dormant (unused or excess) capacity in the wide-area network may be used to communicate data between local cloud 20 and the network cloud 16 in both directions. The content distribution system monitors available dormant capacity in the network 14, and utilizes dormant capacity to perform its data transfer wherever possible. In doing so, the system 10 offloads communications in the wide-area network (provides the network valuable capacity relief) at prime times, when the system 10 may be stressed by strong network usage demands.

When the user enables a certain application on the user device 26, the system can determine how computing resources for the service can be distributed across different locations in the system. In the serverless computing model, different functions of the service can be processed (i.e., computed) at different locations in the system.

With a "Function as a Service" model, certain functional components of the service can be processed in the network cloud 16, while some functional sub-components, e.g., functions of the service that need frequent or rapid interaction with the user, can be processed (i.e., their computes can be enabled) in the local cloud 20.

An application that is compute-heavy, but requires low communication bandwidth, can be run from the network cloud 16, where a vast array of computing resources may be available. An application that requires heavy user interaction as it executes can be pre-positioned in the local cloud 20. Code for functions that need to execute close to the user can be pre-positioned in the local cloud 20, along with any associated data or content that needs to be placed there.

The service as a whole (one or more of the content distribution systems 10, 50, 52 can make this determination proactively (strategically), and decide to pre-position code and content at different locations in the system. The pre-positioning of code and content can be done proactively, ahead of the time of actual usage. When the user runs the application or service, the application is directed to run designated functions from within the local cloud 20 and other functions at other locations in the system (e.g., network cloud 16).

Again, pre-positioning of code and data in this regard can be done using dormant wide-area network 14 capacity. Also, data generated by the application can be uploaded for permanent storage into the network cloud 16 using dormant capacity. This can be done "offline", i.e., at a time when network usage is low and sufficient dormant capacity is available.

A gaming application is a perfect example of a service that may need highly real-time interaction with the user device, as it executes. It may be preferable to position a gaming application in the local cloud 20, wherein communication with the user can be conducted efficiently over a local network. Data generated as a result of playing a game such as game results, histories and other data can be uploaded into the network cloud 16 using dormant uplink network capacity, e.g., at an off-peak hour when the network is less busy.

Mixed mode services are also possible. Mixed mode services are services that may be delivered from the local cloud 20 and the network cloud 16. This may be referred to as a hybrid approach, e.g., delivered from the local cloud 20, but driven by policies issued by the network cloud 16. The network cloud 16 provides overall management of the service such as provisioning, policy, monitoring and visualization.

An example use case for mixed mode services is an internet of things (IoT) service for a home, enterprise or venue. The service is delivered locally from the local cloud, but with policy guidance, monitoring and analytics provided from the network cloud 16. Policy updates are provided in the downlink direction from the network cloud 16 to the local cloud 20 are issued using dormant network capacity. Status updates related to local service operation, as well as analytics, are communicated from the local cloud 20 to the network cloud 16 (i.e., in the uplink direction), also using dormant network capacity.

Another use case is a vehicular (V2X) application. Semi-autonomous local service may be delivered by a local cloud such as a roadside network. Delivery is guided and complemented by policy directions from the master application in the network cloud 16.

Content that is frequently accessed and used may be served from the local cloud (unlike watching a movie or show, which may be a 1-2 time event). Games, software applications for work or leisure, online guides, e-books and several other examples may fall into the category with a high frequency of use. This type of content may be maintained in the local cloud 20, especially if the expectation is for the user to repeatedly access the content in the near future. The "continued positioning" of such content would be directed by algorithmic determinations that the content would continue to get used.

Personal user data that is truly personal to the user can be geofenced within the local cloud 20, especially if this data is frequently accessed by the user. However, a geofenced area may be provided in the network cloud 16 so that the user device can access such data outside the local cloud 20.

Content created by the user such as but not limited to documentation, multimedia content, photos, work product can conversely be pushed to the network cloud 16 from the local cloud 20 and stored therein. The initiation of movement can be directed by user command, or by the system algorithms determining a strong likelihood of the content being of interest to other users, or a lower likelihood of the creating user accessing it frequently. Optimal placement of data, content and code in different parts of the system is a capability of such a system. The content distribution systems 10, 50, 52 uses intelligent mechanisms (e.g., artificial intelligence and machine learning) based schemes to position code, content and user data at the most optimal points in the network, based on popularity factors and likelihood of use or consumption or application execution from those locations.

On an ongoing basis for content that has been placed in the local cloud 20, the content distribution systems 10, 50, 52 determine which items need to be maintained in the local cloud 20, and which items can be replaced by others of higher upcoming relevance. The decision would typically be driven by determined likelihood of continued use of items in the local cloud 20. For example, a movie or show that has been watched by the user may not be viewed again and hence, could be "refreshed" (replaced) with another piece of content that is likely to be viewed in the near future.

On the other hand, items that are likely to be repeatedly used could stay in the storage of local cloud 20. Documents, games, software applications that are frequently used, etc. fall into this category.

The content distribution system 10 can also arbitrage between keeping content objects in the local cloud 20 or the network cloud 16, based on performance trade-offs. For example, factoring in the load on the wide-area network 14 for transporting the data real-time from the network cloud 16 (vs. delivering it from the local cloud 20) is magnified by the expected repetition of user access. For example, if real-time transport of the data represents a not-too-significant load on the network, and/or the expected frequency of access is low, it might make sense not to maintain the content in the local cloud 20.

In summary, many placement metrics for the decision on data placement or maintenance in the local cloud 20 may be used such as whether the user is likely to access (likelihood of use) the content such as a file, user data, an application, streaming content, etc. This could be driven by prior patterns of usage and access by the user, access patterns exhibited by other users in the same area or of a similar demographic, popularity metrics, etc. The expected frequency of use is another placement metric based on how frequently the system expects the content to continue to be accessed by the user. In other words, the repeated popularity of the content. Another placement metric is the load on the wide-area network 14 for delivering the content real-time from the network cloud 16 to the user, on demand. Yet another placement metric is a compromise in performance (latency/jitter/throughput degradations) from delivering, each time, from deep in the network. Security considerations, e.g., truly personal data may also preferentially be maintained in the local cloud 20.

The system is minimally intrusive with the communication network 14 in that the content placement process utilizes dormant (or excess, or unused) capacity in the underlying wide-area network 14 (e.g., cellular, satellite or other broadband network). The content distribution system 10 continually works with the wide-area network 14 to determine excess capacity (capacity that is unused by regular network traffic); works out target throughputs to be applied; and schedules deliveries between the network cloud 16 and the local cloud 20 using the available dormant capacity that is determined. This would work in both directions: uplink and downlink.

Figure 8:
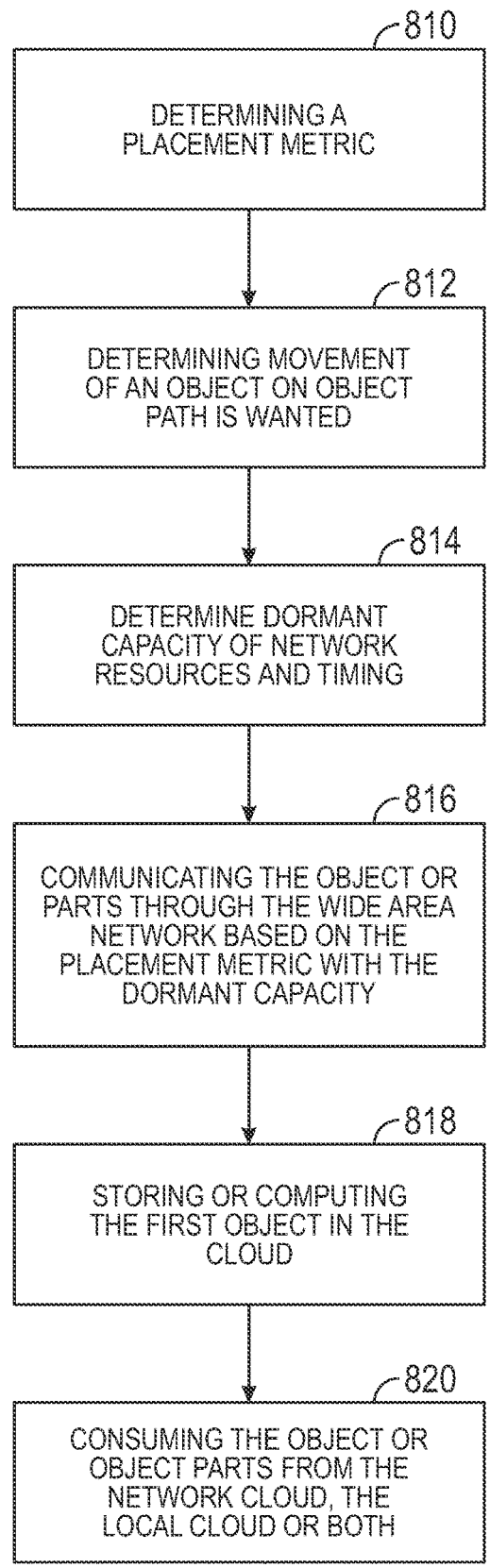
FIG. 8 is a signal diagram of a method for accessing content by the system.

Referring now to FIG. 8, dormant (unused or excess) capacity in the wide-area network 14 is used to place content or data (collectively referred to an object) in the local cloud 20, i.e., move object from network cloud 16 to local cloud 20. As stated earlier, the objects pushed to different locations for pre-positioning (using dormant capacity) can be executables (code), content to be distributed or data (user data or data generated by an application or service). The object may have object parts that are located in different places, so the following description applies to objects and parts of the objects. The system determines a placement metric for the object or object parts in step 810. Different types of placement metrics were described above. In step 812, the movement of the object or parts thereof is wanted when a particular placement metric is determined. The communication of the object or parts from the network cloud 16 to the local cloud 20 or the local cloud 20 to the network cloud 16 may be performed. In step 814, the content distribution system (10, 50, 52) interacts with the network 14 to determine network capacity availability (i.e., unused/excess/dormant capacity) of the system resources including the communication network, the compute and the storage availability. Network capacity may be determined via periodic usage reports being received from the network 14, or via on-demand capacity usage probe requests sent to the network. Based on the determination of available dormant capacity, the system 10 determines how much information can be pushed through using dormant capacity, e.g., target throughputs that can be applied. Likewise, compute capacity for executing computer code of applications or programs may be determined. Communicating a first part of the first object to the local cloud based on a higher performance of fetching from the local cloud as compared to the network cloud, and communicating a second part of the first object to the network cloud based on a compute requirement of the second part. Each part or content may include a fulfillment requirement meaning a minimum desirable speed of communication, a minimum processing speed of the compute or a minimum amount of storage (or combinations thereof) for the local cloud and the network cloud may be desired to process or fulfil the objects or object parts. The network cloud efficiency and the local cloud efficiency may be determined by the resource characteristic module 740 described above. The local cloud efficiency is based on system bandwidth outweighing a local compute. That is, when processed data will arrive at the user faster if being computed in the compute of the local cloud (faster than computing in the network cloud and communicating the data through the network). The network cloud efficiency is based on the network compute outweighing the system bandwidth. That is, when it is more important for the object to be quickly determined without latency, the local cloud efficiency may be higher. When the network cloud can process the data and still deliver the data based on the network speed faster than processing the data in the local cloud, using the network cloud is preferred (has a higher network cloud efficiency). Sometimes the local or network cloud may not have the compute resources available for processing which slows down the system.

In step 816, the system communicates the object through the wide-area network in response to the placement metric and based on the dormant capacity. To form the communication, the system can then command the pre-positioning endpoint (in the local cloud 20 or elsewhere) to pull the information into that location or the system can push the information to that location. The communication applies to both the parts of the objects and the objects themselves.

In step 816 when the first object is communicated to the local cloud associated with the user device or the network cloud based on the placement metric, parts of the object may be treated differently. That is, the parts may be sent to different locations for storage or processing using the compute. A first part of the first object may be communicated to the local cloud based on a first fulfillment requirement of the first part compared to local cloud resources and communicating a second part of the first object to the network cloud based on a second fulfilment requirement of the second part compared to network cloud resources.

Communicating the first part of the first object to the local cloud may be based the local cloud efficiency being higher and communicating a second part of the first object to the network cloud based on the network cloud efficiency. More specifically, the local cloud efficiency and a network cloud efficiency may be determined. The local cloud efficiency and the network cloud efficiency may be compared. The first object may be communicated to the local cloud associated with the user device or the network cloud based on the placement metric by communicating a first part of the first object to the local cloud and communicating a second part of the first object to the network cloud based on comparing the local cloud efficiency and the network cloud efficiency for each of the objects.

Communicating the first object to the local cloud associated with the user device or the network cloud may be performed by broadcasting or unicasting the object (or object parts). Broadcasting or unicasting may use one or more resource characteristics form the resource characteristic module. For example, if content if popular or demanded by a large number of users, the object may be broadcasted rather than unicasted.

In step 818, the object (or parts thereof) is stored in the memory or processed in the compute in the location to which it is communicated. For example, the object may be stored or processed in the local cloud 20 or the network cloud 16.

In step 820, the object or object parts may be consumed from the local cloud or network cloud.

The above, is a very high-level general case of the transfer between the network and local clouds. The dormant capacity may be used to communicate content data objects flowing in the downlink direction from the network cloud 16 to the local cloud 20 using dormant capacity. Broadcasting or unicasting may be used for communicating. Some of the types of data include but are not limited to consumable content/objects (e.g., television shows, movies) that can be pre-positioned (cached) for future viewing by the user; user data, stored in the network cloud 16, that is synchronized periodically to the local cloud 20; user data that the system expects the user to access near-term, or to access frequently; personal user data, created initially in the network cloud 16, that the user may prefer to geofence within the local cloud 20; application code and data that can be pre-positioned in the local cloud 20 from applications that are set up to execute in the local cloud 20; policy and configuration information, related to the operation of services in the local cloud 20, that the network cloud 16 may need to propagate to the local cloud 20; files stored in the network cloud 16 that the user downloads or opens, and, gaming and other communication-heavy applications that can be positioned in the local cloud 20.

In addition, the system may also be used for communicating content/objects in the uplink direction from the local cloud 20 to the network cloud 16. The present system uses dormant (unused or excess) capacity in the wide-area network 14 to move content/object in the uplink direction. The system tried to optimally use of idle network resources (resources that the network operator has already invested in; resources that represent sunk cost to the network operator) in the communication. Examples of data that can be uploaded into the network cloud 16 from the local cloud include using dormant capacity include user data being periodically synchronized to the network cloud 16; updates to documents stored in the network cloud 16 by the user; analytics, audit trails etc. resulting from the operation of services in the local cloud 20 that may be pushed for storage into the network cloud 16, for example, analytics, historical data resulting from an IoT or home security service running in the local cloud 20; data generated by applications run by the user, e.g., game results and data, outputs of applications run locally by the user; content or object created by the user in the local cloud 20, which the user may want to propagate to the network cloud 16 and store therein; data that is generated within the local cloud 20 by virtue of the user's online activities, e.g., email, texts, social media content that the system determines the user may not access near-term or use frequently; and, application-generated data that is of long-term relevance (e.g., historical/auditing/analytics data) can be uploaded into the network cloud 16, if it is not expected to be accessed by the user frequently, or in the near future. The same considerations would apply to personal user data or content, or objects created by the user.

Figure 9:
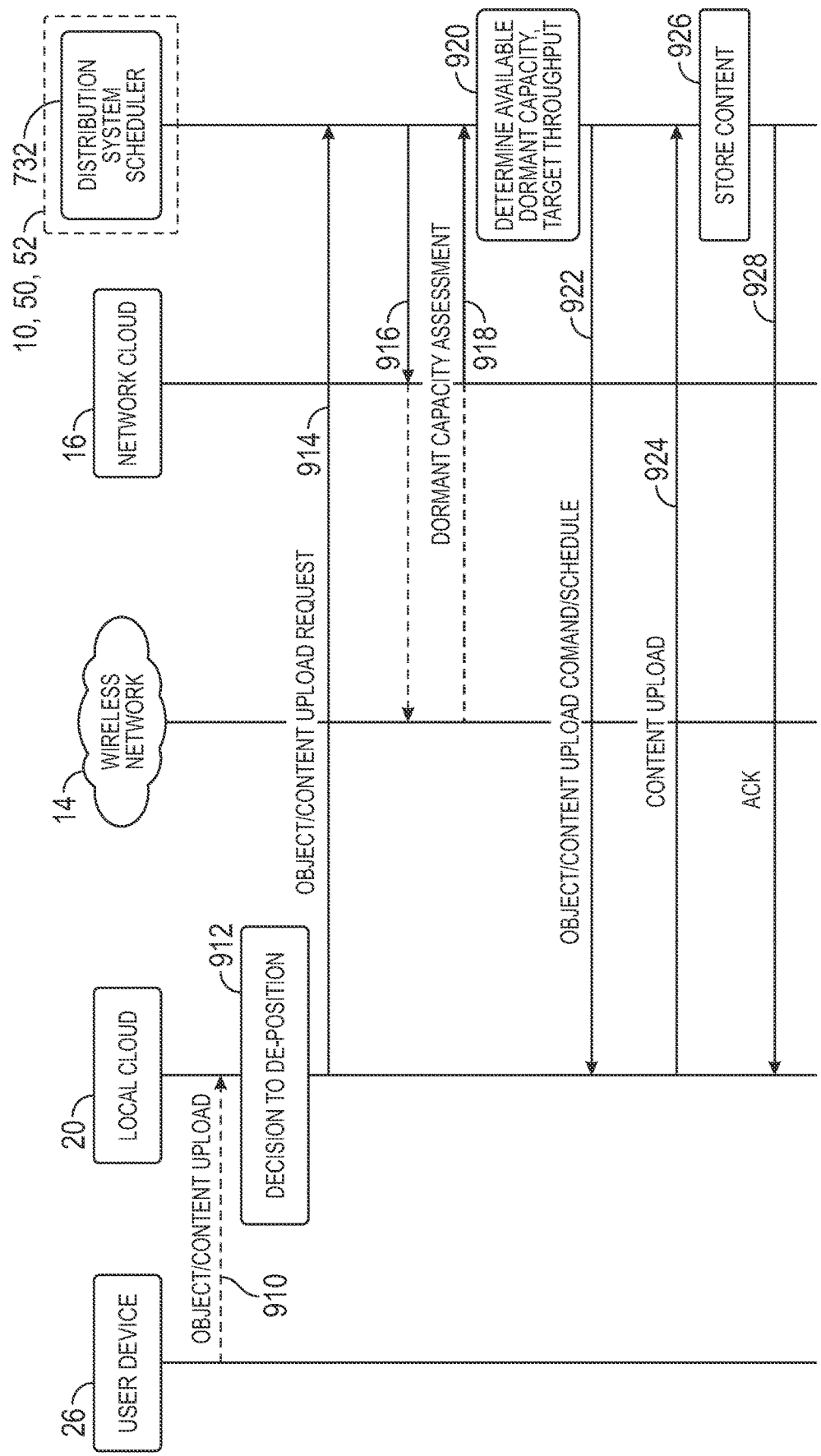
FIG. 9 is a signal diagram and method for redirecting a content request.

Referring now to FIG. 9, most of the above-mentioned kind of data falls into the category of not needing to be propagated to the network cloud 16 in real-time. That is, the data does not need to be moved as soon as the data is generated or updated. Much of the data can be uploaded or synched to the network cloud 16 "offline" when the wide-area network 14 is less busy (e.g., off-peak hours), and when dormant capacity is available.

In step 910, the end user device has uploaded an object (content, data an application) into the local cloud 20. This could be a preexisting condition for this scenario. Examples of objects include but are not limited to documents created/modified by the end user, media communication received or sent by the user, content or object created by the user and outputs of applications run locally. The object has an identifier associated therewith such as a numerical or alphanumerical identifier.

In step 912, the content distribution system 10, 50, 52 (one or more) makes a decision to upload the content or object from the local cloud 20 to the network cloud 16. The decision may be made autonomously by the local cloud 20 through its associated content distribution system 50, or by the content distribution system 10 working in concert with the local cloud 20. Knowledge of the content or object may also be communicated to the network content distribution system 52 and therefore a decision to move the content or object may be made there. The placement metrics that may drive such a decision are described above. In step 914 the local cloud 20 issues a content or object upload request to the content distribution system 10, 50 52 and, more particularly, to a content distribution system scheduler 734.

The content distribution system 10 may interact with the wide-area network 14 to determine the quantum of dormant capacity available in the wide-area communication network 14. For example, a capacity request signal 916 may be used to query the network cloud 16 or the network 14. A capacity response report or signal 918 may be generated providing capacity data corresponding to a network capacity presently or for some forecasted time period in the future. The system 10, alternatively, may have already received such an assessment from the wide-area network 14 as part of a periodic usage report, for example. The content distribution system 10 uses this information to determine how much data could be transferred through the network 14, and at what point in time this transfer could happen in step 920. Since the subsequent content or object transfer will be in the uplink direction, the assessment determines the quantum of uplink dormant capacity available. The uplink dormant capacity available could be expressed in terms of Physical Resource Blocks available in the uplink channel of the cell that the device is attached to in an LTE or 5G system. The system uses the obtained capacity usage metrics to determine the volume of data that can be transferred using this dormant capacity, i.e., the target throughput that can be applied. Content distribution system 10 issues a content or object upload command to the local cloud 20 in step 924. The content or object upload command may include various types of data, for example: a schedule (i.e., when or at what points in time the local cloud 20 can move data to the network cloud 16); the target throughput(s) that can be applied, the destination to send the content or object to (e.g., a URL), etc. The local cloud 20 transfers the target content or object to the network cloud 16, using the schedule specified by the content distribution system 10, and applying the target throughput(s) specified in the content or object upload command. In step 926, the network cloud 16 stores the content or object within its storage system, storage 414'. (Exemplarily, the transfer could be done via an HTTP POST primitive targeted to the URL specified in the Upload Command). The network cloud 16 may then return an acknowledgement signal back to the local cloud 20 in step 928.

Figure 10:
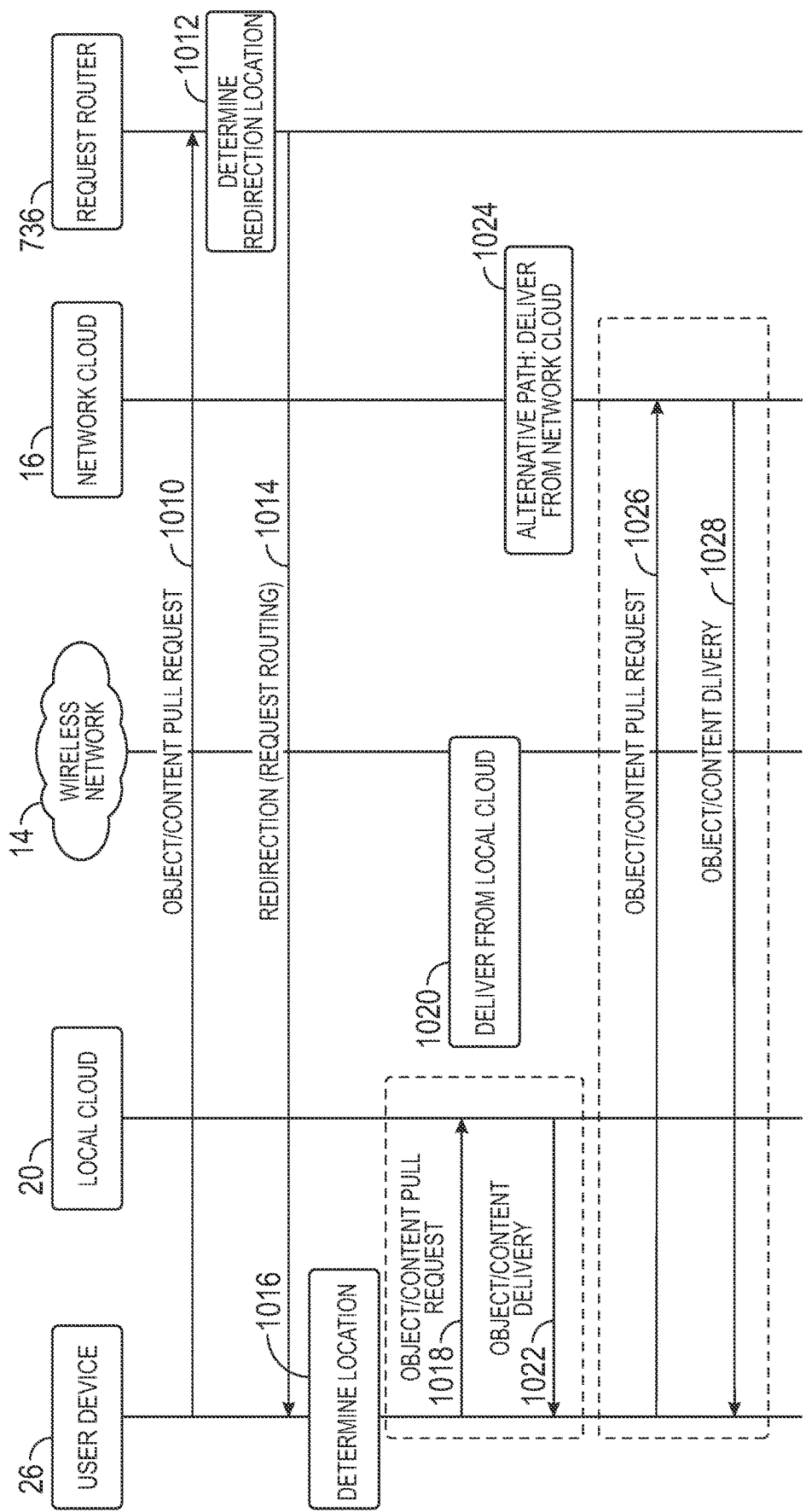
FIG. 10 is an alternate signal diagram according to the method of FIG. 9 where queries are directed to the local cloud first.

Referring now to FIG. 10, various flexible policies may can be applied to direct the placement of data and content or object in the local cloud 20 or network cloud 16. For example, a security policy could direct certain types of user data to be maintained strictly within the local cloud 20. Based on a policy to secure, the first object may be communicated to or maintained in the local cloud or the network cloud. The security policy may include security and privacy requirements as well as geofencing of data.

The present example also postulates that when the user device wants to access content or object, applications or services, the content distribution system 10 points the user device to the precise location where the content or object or application resides. The system 10 fetches and delivers the object from either local cloud 20 or network cloud 16 based on where the content or object resides, performance parameters, etc. The redirection is done in a seamless manner wherein the end user device is unaware of the precise location the content or object is coming from.

After object having an object identifier is created and stored in one of the clouds, the end user device 26 looks for the target content and issues an object/content pull request signal in step 1010. The request includes identifier data for the object such as a content identifier. For example, the request could be done via an HTTP GET command. The request may get routed to a request router 738, which determines where the content resides. In step 1012 the request router determines the redirection location identifier such as a URL. In step 1014, the request router 738 redirects the end user device 26 to the location where the target content resides using a redirection or request routing signal having the location data and possibly the content or object identifier therein. The redirection could be done via HTTP, Domain Name Service (DNS) or other possible methods. The redirection may also be a recursive or cascading process of multiple redirections via different target locations.

In step 1016, the device determines the target location for the content. If the target location in the redirection signal is in the local cloud 20, the device issues a content pull request signal at 1018 (e.g., via an HTTP GET primitive) to the local cloud 20. In step 1020, the local cloud 20 delivers the content to the device. This may be performed, for example, by a video streamed to the end device with an object/content delivery signal in 1022.

Alternatively, if the redirection signal indicates the content is in the network cloud 16 at 1024, the device issues an object or content pull request signal in step 1026 (e.g., via an HTTP GET primitive) and communicates the signal to the network cloud 16. The network cloud 16 delivers the content to the device in step 1026.

Figure 11:
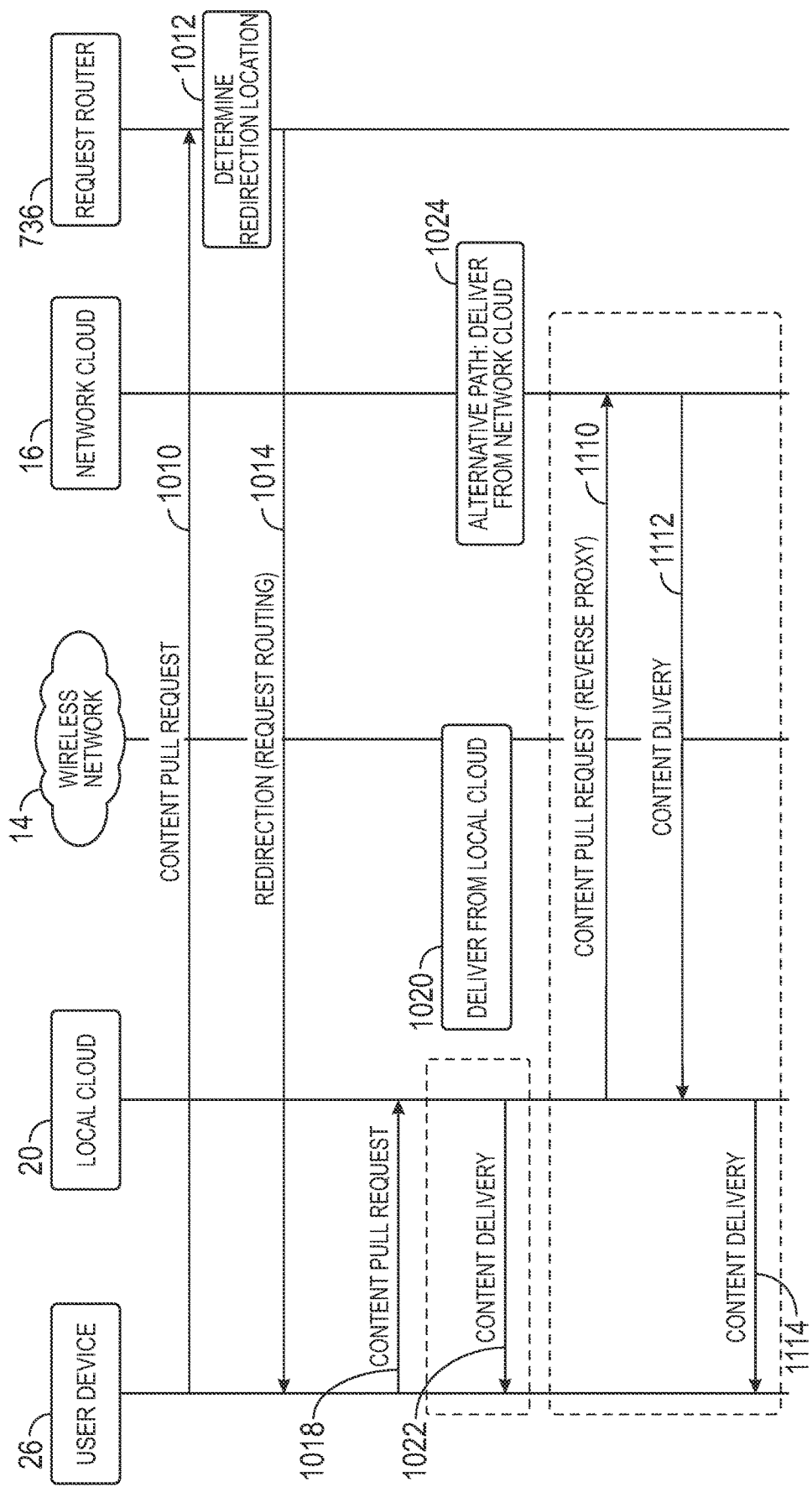
FIG. 11 is a signal diagram of a method of obtaining content from a cloud device based on a request to the local cloud.

Referring now to FIG. 11, an alternate approach to FIG. 10 is set forth. Steps 1010-1014 are the same except. In this example step 1016 is not performed in the end user device which is redirected to the local cloud 20. The user device 26 issues a content pull request (e.g., via an HTTP GET primitive) to the local cloud 20 in step 1018. Step 1018 is not option as in FIG. 1018.

If the local cloud 20 has the requested content determined in 1020, the local cloud 20 delivers the content to the device in step 1022.

Alternatively, if the requested content is not available in the local cloud 20 (e.g., a "cache miss" is encountered), the local cloud 20 forwards the content pull request to the network cloud 16 in step 1110. Exemplarily, this could be done via a reverse proxy mechanism with the local cloud 20 "proxying" the end device's HTTP request to the network cloud 16. The network cloud 16 delivers the content to the local cloud 20 in step 1112. In step 1114, the local cloud 20 delivers the content to the device.

In this manner, data and content are fetched seamlessly from wherever in the system they reside. The end device does not need to be aware of precisely where the data is but only requires a user identifier (e.g., an alphanumeric or numeric identifier). As the data moves around in the system, the device is directed each time to the current location of the data.

Figure 12:
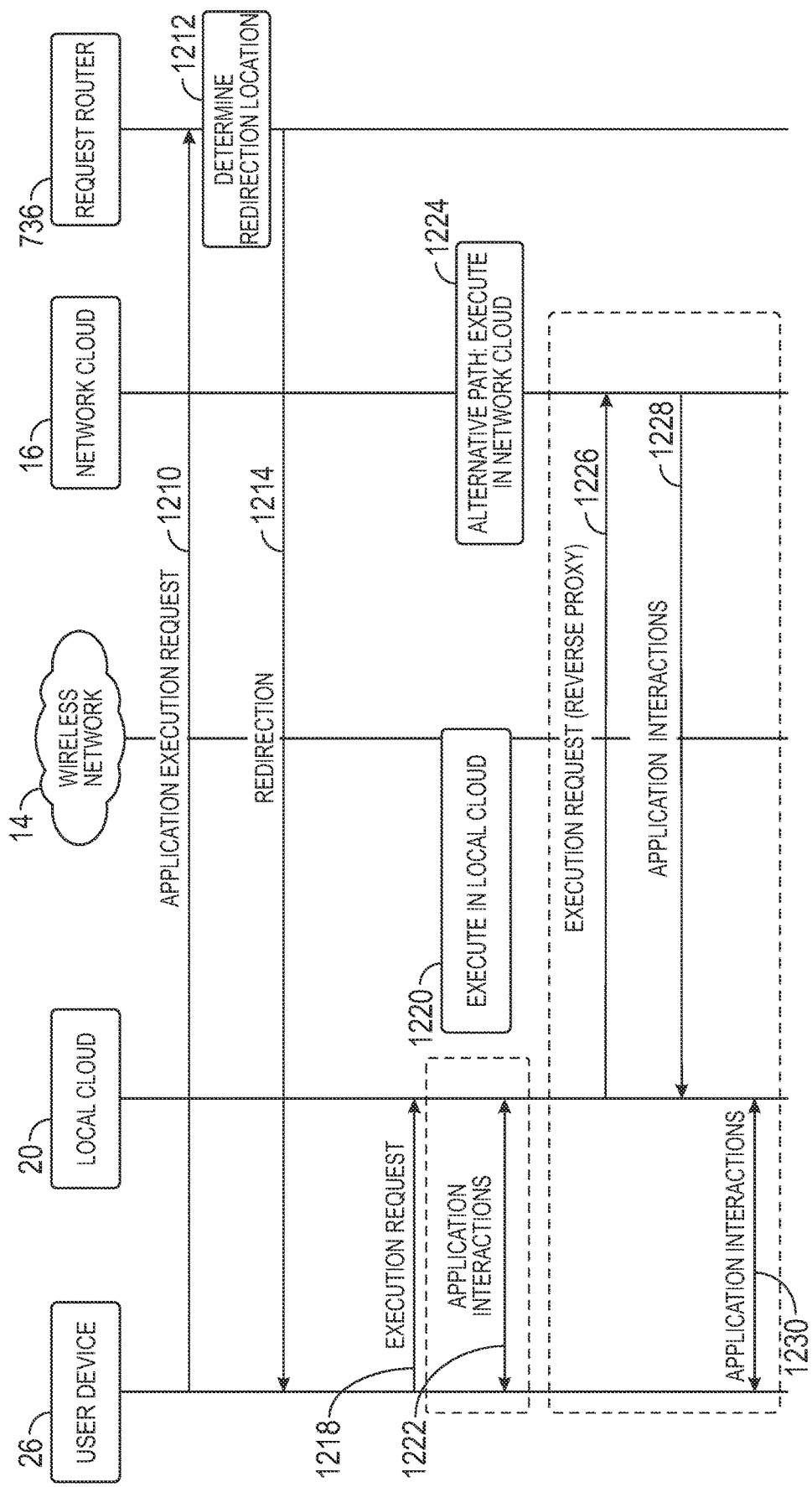
FIG. 12 is a signal diagram of a method for executing applications using redirection.

Referring now to FIG. 12, a similar approach applied for access to applications or services as well. The system seamlessly directs the user device to the location(s) where the application or services resides and the where the compute needs to execute from. In the case of distributed application execution, fragments of the application can run at different locations in the system.

An execution request signal is generated in step 1210. The execution request may get routed to a request router 738, which determines where the to execute the application. In step 1212 the request router determines the execution location identifier such as a URL. In step 1214, the request router 738 redirects the end user device 26 to the location where the target content resides using a redirection or request routing signal. The redirection could be done via HTTP, Domain Name Service (DNS) or other possible methods. The redirection may also be a recursive or cascading process of multiple redirections via different target locations.

The user device 26 issues an execution request to the local cloud 20 in step 1218. Step 1218 is not optional step.

If the local cloud 20 is to execute the code determined in 1220, the local cloud 20 executes and provides application interactions in step 1222.

Based on the interactions, step 1224 determines the alternate path for execution. Alternatively, if the execution is not performed in the local cloud 20, the local cloud 20 forwards the execution request is communicated to the network cloud 16 in step 1226 via a reverse proxy mechanism with the local cloud 20 "proxying" the end device's HTTP request to the network cloud 16. The network cloud 16 generates application interactions in step 1228 which are communicated to the local cloud 20. In step 1230, the local cloud 20 delivers the application to the device.

Figure 13:
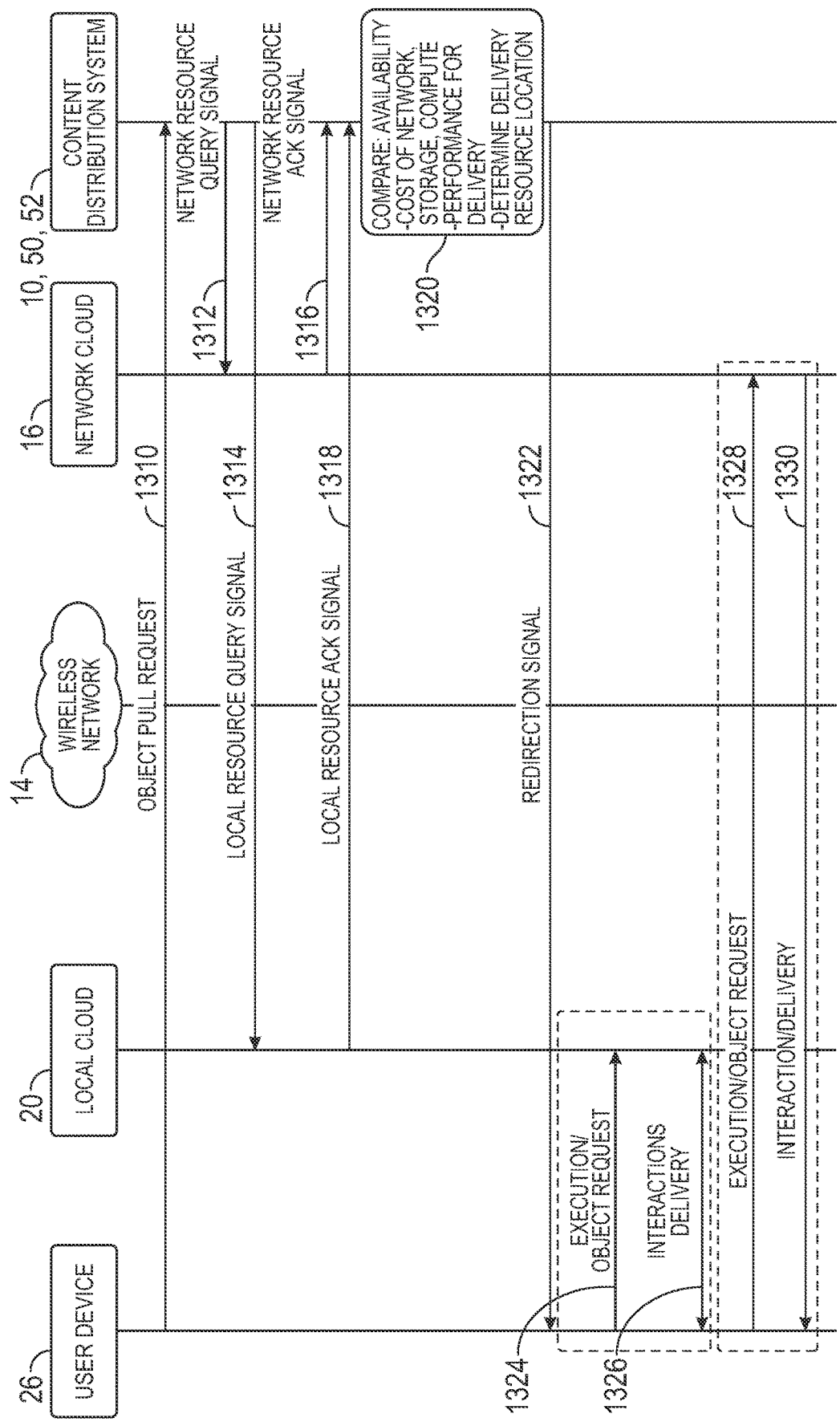
FIG. 13 is a signal diagram of a method for executing applications using dormant capacity.

Referring now to FIG. 13, the content distribution system 10 works with all available networks to assess the available dormant capacity at any point of time. Metrics indicating network resources used (e.g., spectrum usage, compute resources and storage) are obtained from available networks, and these are used to estimate available dormant capacity. The content distribution system 10 pushes content over any available network or aggregation across multiple available networks, using the respective dormant capacity levels.

The content distribution system 10 may select one or more out of all available transmission networks. The use of network resources can be optimized by selecting the best network to use, if the user or device is accessible via multiple paths from a performance perspective, selecting the best network to use, from a cost perspective, aggregating bandwidth across multiple networks (pathways available to the user) and using multiple paths simultaneously, and harvesting underutilized dormant network capacity, e.g. using network paths when regular use is low, on a consistent basis tapping to unused capacity, etc.

The system architecture set forth herein also enables the personal cloud 610 to host services and applications. Resources (compute, storage, network) in the personal cloud can be exposed to third-party application providers via open APIs. Third-party application providers can use the exposed resources to position and run applications within the personal cloud associated with a user device of the user. Examples of this are gaming applications, Internet of Things (IoT) services, multimedia applications, security applications, etc.

A signal diagram and method for obtaining content or using other system resources is set forth. In this example, the user device generates a content pull request that is communicated to the content distribution systems 10, 50, 52. One or all of the content distribution systems 10, 50, 52 may work together or independently to determine whether an object is available at various resources within the network including the local cloud 20 and the network cloud 16. The object pull request signal 1310 may have various data associated therewith including a resource identifier such as content identifier or an application or program identifier. That is, the object pull request signal may identify the content desired or the program or application that is desired to be executed using network resources.

After the object pull request signal 1310 is received at the content distribution system 10, 50, 52, a network resource query signal 1312 is generated. The content distribution system 10, 50, 52 forms and communicates the network resource query signal 1312 to the network cloud 16. The network resource query signal comprises data that includes a content identifier if content is desired to be located at the network cloud 16. Likewise, the content distribution system

10, 50, 52 generates a local resource query signal 1314 that is communicated to the local cloud 20. The resource identifier, such as a content identifier or program or application identifier, is communicated with the local resource query signal.

A network resource acknowledge signal 1316 is generated at the network cloud 16 and contains data regarding the availability of content within the network cloud corresponding to the content identifier from the object pull request. A data indication such as a "yes" or "no" (1 or 0) may be used to indicate the yes or no answer. Other data may include information about other resources including network availability and processing or compute availability.

A local resource acknowledge signal 1318 is generated at the local cloud 20 and is communicated to the content distribution system 10, 50, 52. Both the network resource acknowledge signal 1316 and the local resource acknowledge 1318 are communicated through the wireless network 14. The local resource acknowledge signal may include availability data for a content identified by the object pull request signal 1310 and availability of compute and network availability.

In step 1320, the availability from the network resource acknowledge signal 1316 and the local resource acknowledge signal 1318 is analyzed together with the cost of using one or more networks, the storage availability and the compute availability. As mentioned above, the availability, the cost of using a network, the storage availability and the compute availability may be communicated in the acknowledgement signals 1316, 1318. Likewise, the performance or delivery may also be determined based upon the network data returned from the wireless network. A redirection signal 1322 is communicated from the content distribution system 10, 50, 52 to the user device 26. The redirection signal provides a content location identifier or URL for content. The redirection signal may also contain a compute identifier and network identifier to be used for performing the request from the user device. Depending on the data contained within the redirection signal, resources at the local cloud 20 or the network cloud 16 may have its resources used to satisfy the request of the object pull request signal 1310. When the resources available at the local cloud 20, an execution/object request signal 1324 is generated to request the object or have the local cloud performed or execute the code. Interactions or delay of the objects using the signal 1326. The interaction/delivery signal 1326 delivers the content or uses the resources of the local cloud 20 to obtain the content or have the application process.

Signal 1328 is generated by the user device 1326 when the resource requested is to be provided from the network cloud 16. The execution/object request signals for 1324, 1328 provide data to begin the execution or request the content from the respective cloud. After step 1328, step 1330 delivers the content or provides interaction data corresponding to interaction of the application or program.

In summary, the above methods use the local cloud content distribution or the network cloud distribution system that are programmed to various aspects of the method. The user device generates a request for a first object. The request for the first object is communicated to one or both cloud distribution systems. A network resource query signal is communicated from the distribution system to the network cloud and local resource query signal from the distribution system to the local cloud. A first resource acknowledgement signal is communicated from the network cloud and a second resource acknowledgement signal from the local cloud. A resource is selected from the plurality of resource locations based on availability of the first object at the plurality of locations, and comparing networking, storage and compute costs and a performance for using the resource of the local cloud and the network cloud. The distribution system generates a redirect signal comprising an identifier for the resource. The redirect signal is communicated from the distribution system to the user device. A request from the user device is communicated to the resource for the first object based on the identifier.

The system may take into consideration parts of the first object as well. Communicating the redirect signal may include communicating the redirect signal for a first part of the first object corresponding to the local cloud and a second part of the first object from the network cloud. A first request for the first part may be communicated to the local cloud and a second request for the second part communicated to the network cloud. The first part may be consumed from the local cloud and the second part from the network cloud synchronously.

The method may also entail executing the first part from the local cloud and executing the second part from the network cloud synchronously. Alternatively, the first object may be executed at the resource based on the request.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
   determining a first placement metric for a first object;
   communicating the first object to a local cloud associated with a user device or a network cloud based on the first placement metric by control of a content distribution system using dormant network capacity in a downlink direction;
   storing the first object in the local cloud or the network cloud; and
   consuming the first object using the local cloud or the network cloud;
   forming a second object and storing the second object in the local cloud;
   communicating the second object from the local cloud associated with the user device to the network cloud based on a second placement metric by control of a content distribution system using dormant network capacity in an uplink direction.

2. The method of claim 1 wherein communicating the first object comprises communicating a first part of the first object to the local cloud and a second part of the first object to the network cloud based on the first placement metric.

3. The method of claim 2 wherein consuming the first object comprises consuming the first part from the local cloud and consuming the second part from the network cloud synchronously.

4. The method of claim 1 wherein communicating the first object comprises communicating the first object by a personal cloud content distribution system associated with the user device.

5. The method of claim 1 further comprising communicating the first object to the local cloud through a first communication network or a plurality of communication networks.

6. The method of claim 1 further comprising selecting at least one communication network from a plurality of networks based on bandwidth availability in the plurality of networks: and
communicating the first object to the local cloud through the at least one communication network.

7. The method of claim 1 further comprising communicating the first object to the network cloud through a first communication network or a plurality of communication networks.

8. The method of claim 1 further comprising selecting at least one communication network from a plurality of networks based on bandwidth availability in the plurality of networks: and
communicating the first object to the network cloud through the at least one communication network.

9. The method of claim 1 wherein communicating the first object to the local cloud associated with the user device or the network cloud comprises communicating the first object from the local cloud to the network cloud based on a change to the first placement metric.

10. The method of claim 1 wherein communicating the first object to the local cloud associated with the user device or the network cloud comprises communicating the first object from the network cloud to the local cloud based on a change to the first placement metric.

11. The method of claim 1 wherein communicating the first object to the local cloud associated with the user device or the network cloud based on the first placement metric comprises communicating the first object to the local cloud associated with the user device or the network cloud based on a policy to secure the first object in the local cloud.

12. The method of claim 11 further comprising controlling the policy to secure the first object from the user device.

13. The method of claim 11 further comprising controlling the policy to secure the first object from the content distribution system.

14. The method of claim 1 wherein communicating the first object to the local cloud associated with the user device or the network cloud based on the first placement metric comprises communicating the first object to the local cloud associated with the user device or the network cloud by broadcasting or unicasting.

15. The method of claim 1 wherein communicating the first object to the local cloud associated with the user device or the network cloud based on the first placement metric comprises communicating the first object to the local cloud associated with the user device or the network cloud based on the first placement metric comprising a likelihood of the user device using the first object and a timeliness of the likelihood of the user using the first object.

16. The method of claim 1 wherein communicating the first object to the local cloud associated with the user device or the network cloud based on the first placement metric comprises communicating the first object to the local cloud associated with the user device or the network cloud based on the first placement metric comprising an expected frequency of use by the user device.

17. The method of claim 1 wherein communicating the first object to the local cloud associated with the user device or the network cloud based on the first placement metric comprises communicating the first object to the local cloud associated with the user device or the network cloud based on the first placement metric comprising a comparison of a network bandwidth requirement for fetching the first object and, storage and compute costs for accessing the first object.

18. The method of claim 1 wherein communicating the first object to the local cloud associated with the user device or the network cloud based on the placement metric comprises communicating the first object to the local cloud associated with the user device or the network cloud based on the placement metric comprising a higher performance experienced by fetching the first object by the user device from the local cloud versus fetching the first object from the network cloud.

19. The method of claim 1 wherein determining the first placement metric for a first object comprises determining the first placement metric for the first object comprising at least one of user data, media content, gaming data, an executable software object, a gaming application, a file accessed by the user device, a policy and a configuration information from the network.

20. The method of claim 1 wherein storing the first object in the local cloud or the network cloud comprises storing the first object in the local cloud and periodically synchronizing the first object in the local cloud from the network cloud.

21. The method of claim 1 wherein storing the first object in the local cloud or the network cloud comprises storing the first object comprising a backup of personal data from the user device in the local cloud.

22. The method of claim 1 wherein storing the first object in the local cloud or the network cloud comprises storing the first object in the network cloud using dormant network capacity in an uplink direction.

23. The method of claim 1 wherein placement of the first object at the network cloud comprises communicating the first object to the network cloud based on the first placement metric, said first placement metric based on a low likelihood of the user device using the first object or a lack of timeliness of the likelihood of the user device using the first object.

24. The method of claim 1 wherein communicating the first object to the local cloud associated with the user device or the network cloud based on the first placement metric comprises communicating the first object to the network cloud based on the first placement metric comprising an expected frequency of use by the user device below a usage threshold.

25. The method of claim 1 wherein communicating the first object to the local cloud associated with the user device or the network cloud based on the first placement metric comprises communicating the first object to the network cloud based on the placement metric comprising higher performance resulting from storage and compute costs for accessing the first object outweighing network bandwidth requirements for fetching the first object.

26. The method of claim 1 wherein communicating the first object to the local cloud associated with the user device or the network cloud based on the first placement metric comprises communicating a first part of the first object to the local cloud based on a higher performance of fetching from the cloud as compared to the network cloud and, communicating a second part of the first object to the network cloud based on a compute requirement of the second part.

27. The method of claim 1 wherein communicating the first object to the local cloud associated with the user device or the network cloud based on the first placement metric comprises communicating a first part of the first object to the local cloud based a first fulfillment requirement of the first part compared to local cloud resources and communicating a second part of the first object to the network cloud based on a second fulfilment requirement of the second part compared to network cloud resources.

28. The method of claim 1 further comprising determining a local cloud efficiency and a network cloud efficiency and wherein communicating the first object to the local cloud associated with the user device or the network cloud based on the first placement metric comprises communicating a first part of the first object to the local cloud based the local cloud efficiency and communicating a second part of the first object to the network cloud based on the network cloud efficiency.

29. The method of claim 28 wherein the local cloud efficiency is based on system bandwidth outweighing a local compute and the network cloud efficiency is based on the network compute outweighing the system bandwidth.

30. The method of claim 1 further comprising determining a local cloud efficiency and a network cloud efficiency, and comparing the local cloud efficiency and the network cloud efficiency, and wherein communicating the first object to the local cloud associated with the user device or the network cloud based on the first placement metric comprises communicating a first part of the first object to the local cloud and communicating a second part of the first object to the network cloud based on comparing.

31. The method of claim 1 wherein communicating the first object to the local cloud associated with the user device or the network cloud based on the first placement metric comprises communicating the first object to the network cloud based on the first placement metric comprising a policy to secure the first object in the network cloud.

32. The method of claim 31 further comprising controlling the policy to secure the first object in the network cloud by the user device.

33. The method of claim 31 further comprising controlling the policy to secure the first object in the network cloud by the distribution system.

34. The method of claim 1 wherein storing the first object in the local cloud or the network cloud comprises storing the first object in the network cloud and periodically synchronizing the first object in the network cloud from the local cloud.

35. The method of claim 1 wherein storing the first object in the local cloud or the network cloud comprises storing the first object comprising an update from the user device to a file stored in the network cloud.

36. The method of claim 1 wherein storing the first object in the local cloud or the network cloud comprises storing the first object comprising analytics data, auditing data, or historical data resulting from an operation of services by the user device at the local cloud.

37. The method of claim 1 wherein storing the first object in the local cloud or the network cloud comprises storing the first object comprising data generated by an application run by the user device in the local cloud.

38. The method of claim 1 wherein storing the first object in the local cloud or the network cloud comprises storing the first object comprising content created by the user device within the local cloud in the network cloud.

39. The method of claim 1 wherein storing the first object in the local cloud or the network cloud comprises storing the first object comprising data that is generated within the local cloud from online activities of the user device with an expected frequency of use below a usage threshold within the network cloud.

40. The method of claim 1 wherein communicating the first object to the local cloud associated with the user device or the network cloud comprises communicating the first object to the local cloud comprising one of a home network, enterprise network, venue network.

41. The method of claim 40 wherein communicating the first object to the local cloud associated with the user device or the network cloud based on the first placement metric comprises communicating the first object to the local cloud based on the placement metric comprising a placement policy determined at the content distribution system.

42. The method of claim 41 wherein communicating the first object to the local cloud associated with the user device or the network cloud based on the first placement metric comprises communicating the first object to the network cloud based on the first placement metric comprising a placement policy determined at the user device.

43. A system comprising: a network cloud; a local cloud; a content distribution system programmed to determine a first placement metric for a first object, communicate the first object to a local cloud associated with a user device or a network cloud based on the first placement metric by control of a content distribution system using dormant network capacity in a downlink direction, and store the first object in the local cloud or the network cloud; and a user device consuming the first object using the local cloud or the network cloud, said content distribution system programmed to communicate a second object from the local cloud associated with the user device to the network cloud based on a second placement metric by control of a content distribution system using dormant network capacity in an uplink direction.

* * * * *